United States Patent
Muto et al.

(10) Patent No.: US 10,898,951 B2
(45) Date of Patent: *Jan. 26, 2021

(54) POWDER PARTICLES COMPRISING THERMOPLASTIC RESIN PARTICLES AND PROCESS FOR PRODUCING GREEN BODY USING THE SAME

(71) Applicant: National University Corporation TOYOHASHI UNIVERSITY OF TECHNOLOGY, Toyohashi (JP)

(72) Inventors: Hiroyuki Muto, Aichi-ken (JP); Atsunori Matsuda, Aichi-ken (JP); Go Kawamura, Aichi-ken (JP); Tatsuya Matsusaki, Aichi-ken (JP)

(73) Assignee: National University Corporation TOYOHASHI UNIVERSITY OF TECHNOLOGY, Toyohashi (JP)

( * ) Notice: Subject to any disclaimer, the term of this patent is extended or adjusted under 35 U.S.C. 154(b) by 239 days.

This patent is subject to a terminal disclaimer.

(21) Appl. No.: 16/060,727

(22) PCT Filed: Dec. 11, 2016

(86) PCT No.: PCT/JP2016/086828
§ 371 (c)(1),
(2) Date: Jun. 8, 2018

(87) PCT Pub. No.: WO2017/099250
PCT Pub. Date: Jun. 15, 2017

(65) Prior Publication Data
US 2018/0369908 A1 Dec. 27, 2018

(30) Foreign Application Priority Data
Dec. 11, 2015 (JP) .................................. 2015-242743

(51) Int. Cl.
*B32B 5/16* (2006.01)
*B05D 7/00* (2006.01)
(Continued)

(52) U.S. Cl.
CPC .......... *B22F 1/0048* (2013.01); *B22F 1/0003* (2013.01); *B22F 1/0062* (2013.01);
(Continued)

(58) Field of Classification Search
CPC combination set(s) only.
See application file for complete search history.

(56) References Cited

U.S. PATENT DOCUMENTS

| 2003/0013794 A1 | 1/2003 | Matsumoto et al. |
| 2003/0127157 A1 | 7/2003 | Iyoda et al. |

(Continued)

FOREIGN PATENT DOCUMENTS

| JP | 3-112845 A | 5/1991 |
| JP | 7-157808 A | 6/1995 |

(Continued)

OTHER PUBLICATIONS

Communication issued by the European Patent Office dated Nov. 20, 2018 in counterpart application No. 16873143.8.
(Continued)

*Primary Examiner* — Hoa (Holly) Le
(74) *Attorney, Agent, or Firm* — Sughrue Mion, PLLC

(57) ABSTRACT

Powder particles for forming a homogeneous green body having a sufficient strength and a process for producing a green body by using the powder particles. A green body is shaped by using powder particles of composite particles in which thermoplastic resin particles are scattered on surfaces of large particles in an amount within a predetermined volume ratio range with respect to the large particles, and loaded to form resin pools in contact point peripheral areas
(Continued)

of adjoining ones of the large particles and form voids in areas other than the contact point peripheral areas when the thermoplastic resin particles are melted. A green body packed with the powder particles each having a small amount of the thermoplastic resin particles attached thereon is placed under a melting condition of the thermoplastic resin particles, the thermoplastic resin is melted and gathers around contact points (or proximal points) of the adjoining powder particles.

14 Claims, 10 Drawing Sheets

(51) Int. Cl.
   *B22F 1/00*      (2006.01)
   *B22F 3/02*      (2006.01)
   *B22F 1/02*      (2006.01)
   *C04B 35/628*    (2006.01)
   *C04B 35/626*    (2006.01)
   *C04B 35/645*    (2006.01)
   *C04B 35/653*    (2006.01)
   *C04B 35/634*    (2006.01)
   *B33Y 70/00*     (2020.01)
   *B22F 3/03*      (2006.01)
   *B22F 9/24*      (2006.01)
   *B22F 3/14*      (2006.01)
   *B22F 3/22*      (2006.01)

(52) U.S. Cl.
   CPC .......... *B22F 1/02* (2013.01); *B22F 3/02* (2013.01); *B22F 3/03* (2013.01); *B22F 9/24* (2013.01); *B33Y 70/00* (2014.12); *C04B 35/628* (2013.01); *C04B 35/62625* (2013.01); *C04B 35/62655* (2013.01); *C04B 35/62802* (2013.01); *C04B 35/62805* (2013.01); *C04B 35/62813* (2013.01); *C04B 35/62844* (2013.01); *C04B 35/62881* (2013.01); *C04B 35/62892* (2013.01); *C04B 35/63424* (2013.01); *C04B 35/63432* (2013.01); *C04B 35/63444* (2013.01); *C04B 35/645* (2013.01); *C04B 35/653* (2013.01); *B22F 1/0018* (2013.01); *B22F 3/225* (2013.01); *B22F 2001/0066* (2013.01); *B22F 2003/145* (2013.01); *B22F 2998/10* (2013.01); *C04B 35/62897* (2013.01); *C04B 2235/3217* (2013.01); *C04B 2235/5436* (2013.01); *C04B 2235/5445* (2013.01); *C04B 2235/604* (2013.01); *C04B 2235/61* (2013.01)

(56) References Cited

U.S. PATENT DOCUMENTS

2006/0251535 A1* 11/2006 Pfeifer .................. B22F 3/1055
                                                        419/36
2009/0044723 A1   2/2009 Hokii et al.
2015/0190840 A1*  7/2015 Muto .................... B05C 19/06
                                                        427/8

FOREIGN PATENT DOCUMENTS

| JP | 8-134504 A    | 5/1996 |
| JP | 2002-160975 A | 6/2002 |
| JP | 2006-521264 A | 9/2006 |
| JP | 2010-064945 A | 3/2010 |
| JP | 2012-101951 A | 5/2012 |
| WO | 2007/011038 A1 | 1/2007 |
| WO | 2012/133696 A1 | 10/2012 |

OTHER PUBLICATIONS

International Search Report for PCT/JP2016/086828 dated Jan. 31, 2017 [PCT/ISA/210].
Jin Isakari, et al., "Dependence of sintering behavior on the packing structure of green body", P14-(C) of Proceedings of the 50th Summer Seminar 2015 of the Association of Tokai Young Ceramists.
Shinya Oda, et al., "Fundamental study on sintering behavior by use of integrated composite powder", 3A04, p. 31 of Proceedings of the 28th Fall Meeting of the Ceramic Society of Japan (2015).
Extended European Search Report dated Jun. 14, 2019 in European Application No. 16873143.8.
Communication dated Mar. 23, 2020, issued by the European Patent Office in application No. 16 873 143.8.

* cited by examiner

COMPOSITE PARTICLE

PVA-added PARTICLE

COMPOSITE PARTICLE

PVA-added PARTICLE

POWDER PARTICLES COMPRISING THERMOPLASTIC RESIN PARTICLES AND PROCESS FOR PRODUCING GREEN BODY USING THE SAME

CROSS REFERENCE TO RELATED APPLICATIONS

This application is a National Stage of International Application No. PCT/JP2016/086828, filed on Dec. 11, 2016, which claims priority from Japanese Patent Application No. 2015-242743, filed on Dec. 11, 2015.

TECHNICAL FIELD

The present invention relates to powder particles to be used as such a raw material of a sintered body as ceramic and metal and a process for producing a green body to be used for producing a sintered body, and particularly relates to powder particles for forming a homogeneous green body having a sufficient strength and a process for producing a green body by using the powder particles.

BACKGROUND ART

In recent years, ceramic materials have been used as structural members or heat resistant members in a variety of fields and widespread as substrates and packages of integrated circuits, sintering saggars and setters, core tubes of electric furnaces and so on. In general, these ceramic materials are produced by forming green bodies with raw material powders by dry or wet forming processes and firing and sintering the green bodies.

In producing the ceramic materials, shrinkage of the green bodies usually occurs due to firing. When the shrinkage is large, the sintered bodies have problems with dimensional accuracy. Since the ceramic sintered bodies are difficult to machine, if the ceramic sintered bodies are poor in dimensional accuracy, correction by subsequent machining needs a lot of labor and costs. In a case of products of complex shape, subsequent machining is often impossible, which greatly affects a yield rate. A method for reducing a shrinkage rate has been proposed (See Patent Literature 1) and this technique suppresses shrinkage, but an obtained shaped body keeps voids therein and when post-fired for densification, the obtained shaped body shrinks due to disappearance of the voids.

Densification is a key factor in property improvement and quality assurance of ceramic materials (sintered bodies). This is because densification brings improvements in mechanical performance and optical characteristics. Since the densification can be achieved by improving sinterability, attempts to improve sinterability are generally made by forming a green body by using fine raw material particles or adding an auxiliary sintering additives. However, raw material powder refinement results in an increased shrinkage rate in firing and addition of an auxiliary sintering additive may cause abnormal grain growth and accordingly may lower sintered body strength.

Under these circumstances, the present inventors have conceived a forming process, which may lead to a solution to the abovementioned conventional problems of attaining both densification of ceramic sintered bodies and shrinkage rate suppression at the same time (See Non-Patent Literatures 1, 2). Specifically, as techniques of Patent Literatures 1, 2, the present inventors have found a phenomenon that when composite particles are fabricated by employing two kinds of particles having different particle sizes and attaching smaller particles on surfaces of larger particles and fired as a starting raw material, owing to effective sintering of the smaller particles, sintering characteristics can be improved and a denser ceramic material can be produced while suppressing an overall shrinkage rate.

On the other hand, as one technique for producing a ceramic shaped body, casting (slipcasting) is used in which a green body is formed by pouring a slurry into a casting mold having a desired three-dimensional shape and molding the slurry. Thus a green body having a complicated shape can be obtained, and a product can be obtained by sintering the green body in a firing furnace. When the green body does not have a sufficient strength, the green body is broken or chipped before fired. In general, therefore, a great amount of an organic binder is used in forming a green body. As a result, a large volume of gas is generated in a degreasing step, and its countermeasure is necessary. Besides, degreasing costs a lot of time and energy, which results in an increase in production costs. Furthermore, shrinkage occurs in proportion to the volume of the organic binder. Moreover, even if a great amount of a binder is used in producing a green body having a complicated geometric configuration, the green body cannot attain a sufficient strength.

As techniques for increasing strength of a green body while suppressing the amount of a binder, techniques have been proposed of obtaining a green body having strength by mixing a predetermined amount of thermoplastic binder powder in sintering powder or mixing or coating a predetermined amount of thermosetting binder powder in or on sintering powder particles and then heating the mixture or the coated particles to a melting temperature of the binder powder (See Patent Literatures 2, 3).

CITATION LIST

Patent Literature

[PTL 1] JP 2006-521264 A
[PTL 2] JP 07-157808 A
[PTL 3] JP 08-134504 A

Non-Patent Literature

[NPL 1] Jin ISAKARI, Satoshi KATO, Go KAWAMURA, Atsunori MATSUDA, Hiroyuki MUTO, P14-(C) of Proceedings of the 50th Summer Seminar 2015 of the Association of Tokai Young Ceramists
[NPL 2] Shinya ODA, Satoshi KATO, Go KAWAMURA, Atunori MATSUDA, Hiroyuki MUTO, 3A04, P31 of Proceedings of the 28th Fall Meeting of the Ceramic Society of Japan (2015)

SUMMARY OF INVENTION

Technical Problem

The techniques of Patent Literatures 2, 3 are to mix thermoplastic or thermosetting binder powder in sintering powder in order to improve strength of a green body. However, having a big difference in specific gravity, the sintering powder and the binder powder are difficult to be mixed uniformly. In order to obtain a good mixture (a good dispersion) of the binder powder and the sintering powder, it is suggested to sufficiently mix these powders with a high shear force. However, this often generates heat. The heat generation causes softening of the binder powder and induces the binder to bond to part of the sintering powder and form lumps. Thus, it is often difficult to obtain a uniform mixture.

It is also suggested to coat the sintering powder with the binder powder, but this coating requires the binder powder to be solved in a solvent or melt the binder powder at a temperature above a melting point to liquefy. Since the binder solution or the binder melt often has viscosity, treatment of the amount of the sintering powder actually used requires high-level control and a large-scale device, so workability is lowered. Besides, due to the sticky of the binder, part of the sintering particles tend to bond to each other and form lumps. Therefore, the binder tends to be unevenly distributed in the entire raw material powder.

It is desired to reduce the amount of the binder in view of shrinkage of a green body in sintering and complications of degreasing. In the above techniques of the binder mixing or coating, however, a reduction in the amount of the binder results in a poor dispersion of the resin in the green body. As a result, the green body becomes heterogeneous and has a difficulty in obtaining sufficient strength. Therefore, it has not been realized yet to provide a green body having homogeneity and a sufficient strength. In particular, with more and more development of additive manufacturing (3D printing) using ceramic powder, products having more complicated shapes are demanded. Therefore, it is expected to provide a green body having a sufficiently high strength for keeping its shape even when the green body is a relatively-large-scaled and complicated structure.

Besides, even when a dense ceramic material is produced by using the techniques described in Non-Patent Literatures 1, 2 while suppressing a shrinkage rate in a firing step, production of a green body must be done first.

In this respect, when the techniques of Non-Patent literatures 1, 2 are applied as they are in using the composite particles shown in Non-Patent Literatures 1, 2 as raw material powder, shear force of mixing may cause the smaller particles attached on the surfaces of the larger particles to be dropped off and may make it impossible to maintain the structure of the composite particles. That is to say, when such composite particles are used as raw material powder, a reduction in the amount of the binder is difficult because the binder reduction needs mixing with a greater shear force. As a result, it has not been realized yet to provide powder particles capable of forming a homogeneous green body having a sufficient strength even when the amount of the binder is reduced and a green body capable of forming a dense ceramic material while suppressing an overall shrinkage rate.

The present invention has been made to solve the above problems and it is an object of the present invention to provide powder particles for forming a homogenous green body having a sufficient strength and a process for producing a green body by using the powder particles.

Solution to Problem

In order to attain the object, a first aspect of the invention about powder particles is powder particles, comprising large particles to be a main component of a sintering body, and thermoplastic resin particles having a smaller particle size than the large particles and loaded on surfaces of the large particles, wherein the thermoplastic resin particles are scattered on the surfaces of the large particles in an amount within a predetermined volume ratio range with respect to the large particles, and loaded on the large particles in a manner to form resin pools in contact point peripheral areas of adjoining ones of the large particles when the thermoplastic resin particles are melted.

Particles mentioned herein mean solids having any outer shape. This is an idea not limited to spherical and round shapes but including a variety of shapes such as cylindrical, disk-like, oval, clumpy, polygonal, flat, plate-like, fibrous, irregular, and rectangular shapes. Of course, the particles can be aggregated particle.

The phrase "on surfaces of large particles" is an idea not limited to locations in direct contact with surfaces of large particles but including locations in indirect contact with the surfaces of the large particles with any substance present therebetween.

A second aspect of the invention about the powder particles is that in the aforementioned first aspect of the invention, the thermoplastic resin particles are within a volume ratio range of from 2% to 5% with respect to the large particles.

A third aspect of the invention about the powder particles is that in the aforementioned first aspect of the invention, the average number of the thermoplastic resin particles loaded on a surface of each of the large particles is not less than 4 and not more than 120.

A fourth aspect of the invention about the powder particles is that in any one of the aforementioned first to third aspects of the invention, small particles having easy sinterability or a function as an auxiliary sintering additive and a smaller particle size than the large particles are attached on the surfaces of the large particles.

A fifth aspect of the invention about the powder particles is that in the aforementioned fourth aspect of the invention, the small particles have an average particle size of not more than 150 nm.

A sixth aspect of the invention about the powder particles is that in the aforementioned fourth or fifth aspect of the invention, the large particles have an average particles size of not less than 500 nm and not more than 5 μm.

A seventh aspect of the invention about the powder particles is that in any one of the aforementioned fourth to sixth aspects of the invention, the surfaces of the large particles are covered with the small particles at a coverage ratio of not less than 40% and not more than 100% with respect to the entire surfaces of the large particles.

An eighth aspect of the invention about the powder particles is that in any one of the aforementioned fourth to seventh aspects of the invention, part or all of the thermoplastic resin particles are loaded on the large particles by way of the small particles attached on the surfaces of the large particles.

A ninth aspect of the invention about the powder particles is that in any one of the aforementioned fourth to eighth aspects of the invention, each of the large particles, the small particles, and the thermoplastic resin particles has a polymer electrolyte on a surface thereof, and contacts another particle by way of the polymer electrolyte.

A tenth aspect of the invention about the powder particles is that in the aforementioned ninth aspect of the invention, the polymer electrolyte held by each of the particles has a thickness of not more than 20 nm.

A first aspect of the invention about a process for producing a green body is a process, comprising a green body forming step of shaping a green body by using the powder particles recited in any one of the first to tenth aspects of the invention, heating the green body above a melting temperature of the thermoplastic resin particles contained in the green body and then cooling the heated green body.

A second aspect of the invention about a process for producing a green body is a process, comprising a first surface charge control step of controlling, in liquid, surface charge of large particles to be a main component of a sintered body; a second surface charge control step of controlling surface charge of thermoplastic resin particles having a smaller particle size than the large particles in liquid in order to attach the thermoplastic resin particles on the large particles treated in the first surface charge control step by electrostatic attraction; a compositing step of fabricating composite particles by mixing, in liquid, the large particles treated in the first surface charge control step and the thermoplastic resin particles treated in the second surface charge control step to composite the large particles and the thermoplastic resin particles by electrostatic attraction; and a green body forming step of shaping a green body by using the composite particles obtained by the compositing step, heating the green body above a melting temperature of the thermoplastic resin particles contained in the green body and then cooling the heated green body.

A third aspect of the invention about the process for producing a green body is that in the second invention about the process for producing a green body, the process comprises a small particle surface charge control step of controlling, in liquid, surface charge of small particles having easy sinterability or a function as an auxiliary sintering additive and a smaller particle size than the large particles so as to have an opposite polarity to that of surface charge of the large particles treated in the first surface charge control step; and a precompositing step of fabricating composite particles of the large particles and the small particles by mixing, in liquid, the small particles treated in the small particle surface charge control step and the large particles treated in the first surface charge control step to composite the large particles and the small particles by electrostatic attraction; the second surface charge control step is to control the surface charge of the thermoplastic resin particles in the liquid so as to have an opposite polarity to that of surface charge of the composite particles fabricated in the precompositing step; and the compositing step is to further composite the composite particles of the large particles and the small particles fabricated in the precompositing step and the thermoplastic resin particles treated in the second surface charge control step.

A fourth aspect of the invention about the process for producing a green body is that in the second aspect of the invention about the process for producing a green body, the process comprises a small particle surface charge control step of controlling, in liquid, surface charge of small particles having easy sinterability or a function as an auxiliary sintering additive and a smaller particle size than the large particles so as to have an opposite polarity to that of surface charge of the large particles treated in the first surface charge control step; a precompositing step of fabricating composite particles of the large particles and the small particles by mixing, in liquid, the small particles treated in the small particle surface charge control step and the large particles treated in the first surface charge control step to composite the large particles and the small particles by electrostatic attraction; and a surface charge recontrol step of further controlling surface charge of the composite particles of the large particles and the small particles fabricated in the precompositing step; the second surface charge control step is to control the surface charge of the thermoplastic resin particles in the liquid so as to have an opposite polarity to that of surface charge of the composite particles controlled in the surface charge recontrol step; and the compositing step is to further composite the composite particles treated in the surface charge recontrol step and the thermoplastic resin particles treated in the second surface charge control step.

A fifth aspect of the invention about the process for producing a green body is that in any one of the second to fourth aspects of the invention about the process for producing a green body, the green body forming step is to shape the green body by using a slurry in which the composite particles obtained in the compositing step are dispersed, dry the shaped green body and then heat the dried green body above the melting temperature of the thermoplastic resin particles.

Advantageous Effects of Invention

According to the first aspect of the invention about the powder particles, the powder particles comprise thermoplastic resin particles loaded on surfaces of large particles, and the thermoplastic resin particles are scattered on the surfaces of the large particles in an amount within a predetermined volume ratio range with respect to the large particles. Since the entire surfaces of the large particles are not covered with the thermoplastic resin particles, if a green body is formed by using these powder particles, it is possible to form a green body packed with the powder particles each having a small amount of the thermoplastic resin particles attached thereon. That is to say, it is possible to form a green body in which the thermoplastic resin particles are uniformly distributed over its entire structure. Besides, when the thermoplastic resin particles are melted while the present powder particles are integrated, resin pools are formed in contact point peripheral areas of adjoining ones of the large particles, so resin is present locally in these areas. Therefore, if the green body is placed under a melting condition of the thermoplastic resin particles, the thermoplastic resin can be melted and gather around contact points (proximal points) of the adjoining powder particles. That is to say, since resin pools are formed, bonding can be focused on contact point portions of the adjoining powder particles and force of bonding the powder particles to each other can be effectively improved by an extremely small amount of the thermoplastic resin. Furthermore, since such an effect is exerted all over the green body, the powder particles have an advantage that a strong green body having little variation in strength can be obtained.

According to the second aspect of the invention about the powder particles, in addition to the advantages exhibited by the aforementioned first aspect of the invention, since the thermoplastic resin particles are within a volume ratio range of from 2% to 5% with respect to the large particles and the very small amount of the thermoplastic resin serves as a binder, a variation in strength can be further decreased.

According to the third aspect of the invention about the powder particles, in addition to the advantages exhibited by the aforementioned first aspect of the invention, since the number of the thermoplastic resin particles loaded on a surface of each of the large particles is not less than 4 and not more than 120, the thermoplastic resin particles can be scattered in an appropriate number for the size of the thermoplastic resin particles, that is, in an amount corresponding to a desired volume on a surface of each of the large particles. In order to be almost evenly loaded on each of the large particles, it is preferred that the amount of the thermoplastic resin particles is not too small. Therefore, the number of the thermoplastic resin particles is defined as not less than 4. On the other hand, when the large particles are large and the thermoplastic resin particles are extremely small, a large number of thermoplastic resin particles need to be loaded in order to load a desired amount of the thermoplastic resin particles on the surfaces of the large particles, but when the number of the thermoplastic resin particles loaded is too large, it is not easy to gather resin around contact points (proximal points) of adjoining ones of the powder particles. Therefore, an upper limit of the number is defined as 120.

According to the fourth aspect of the invention about the powder particles, in addition to the advantages exhibited by any one of the aforementioned first to third aspects of the invention, the following advantage is obtained. Since small particles having easy sinterability or a function as an auxiliary sintering additive and a smaller particle size than the large particles are attached on the surfaces of the large particles, the small particles having a greater reactivity than the large particles can be present in boundaries of the large particles. Therefore, if a sufficient amount of the small particles are attached on the surfaces of the large particles, the small particles can reliably be located on most boundary areas of the large particles. Therefore, a green body formed by using these powder particles can be improved in sinterability. In other words, the large particles to be a main component of a sintered body are relatively large particles and when a green body is formed by using the present powder particles, the volume ratio of the large particles in a sintered body to be obtained can be increased. Since the large large particles can suppress shrinkage caused by sintering, use of the present powder particles can improve sinterability and promote densification of a sintered body to be obtained and at the same time suppress shrinkage.

According to the fifth aspect of the invention about the powder particles, in addition to the advantages exhibited by the aforementioned fourth aspect of the invention, since the small particles have an average particle size of not more than 150 nm, the present powder particles have an advantage that sinterability can be further improved.

According to the sixth aspect of the invention about the powder particles, in addition to the advantages exhibited by the aforementioned fourth or fifth aspect of the invention, since the large particles have an average particle size of not less than 500 nm and not more than 5 µm, the powder particles have an advantage that shrinkage in sintering can be further suppressed.

According to the seventh aspect of the invention about the powder particles, in addition to the advantages exhibited by any one of the aforementioned fourth to sixth aspects of the invention, since the surfaces of the large particles are covered with one-particle-thickness monolayers of the small particles at a coverage ratio of not less than 40% and not more than 100% with respect to the entire surfaces of the large particles, the entire or a considerable range of the surfaces of the large particles are covered with the small particles. Therefore, while the thermoplastic resin particles can be scattered on the surfaces of the large particles by way of the small particles, the small particles can be located in appropriate ranges of boundary areas with the large particles.

According to the eighth aspect of the invention about the powder particles, in addition to the advantages exhibited by any one of the aforementioned fourth to seventh aspects of the invention, the following advantage is obtained. Part or all of the thermoplastic resin particles are scatteredly loaded on the large particles by way of the small particles attached on the surfaces of the large particle. Therefore, while the resin particles can be loaded on the large particles outside the small particles attached on the surfaces of the large particles, the resin particles do not intervene between the small particles and the large particles. As a result, when the thermoplastic resin is melted, only liquefied resin flows and the small particles attached on the surfaces of the large particles can keep their positions. Therefore, the small particles are suppressed from being unevenly distributed together with the flow of the resin, and the present powder particles can keep good sinterability on the whole.

According to the ninth aspect of the invention about the powder particles, in addition to the advantages exhibited by any one of the aforementioned fourth to eighth aspects of the invention, the following advantage is obtained. Since each one of the large particles, the small particles, and the thermoplastic resin particles has a polymer electrolyte on a surfaces thereof and contacts another particle by way of the polymer electrolyte, the particles can be conveniently composited by using ionization effects of polymer electrolytes and electrostatic attraction in an aqueous liquid in producing the present powder particles. Therefore, the amount of the particles to be loaded on the large particles can be controlled in producing the powder particles, and powder particles having the small particles and the thermoplastic resin particles attached in predetermined ranges and having good homogeneity can be realized.

According to the tenth aspect of the invention about the powder particles, in addition to the advantages exhibited by the aforementioned ninth aspect of the invention, since the polymer electrolyte attached to each of the particles has a thickness of not more than 20 nm, the powder particles have an advantage that the amounts of the polymer electrolytes contained can be very small and in producing a sintered body by using the present powder particles, an effect of containing the polymer electrolytes in a degreasing step and an effect exerted by their residue can be extremely slight.

According to the first aspect of the invention about the process for producing a green body, a green body is shaped by using the powder particles recited in any one of the first to tenth aspects of the invention, heated above a melting temperature of the thermoplastic resin particles contained in the green body and then cooled in a green body forming step. A green body is thus produced.

Since the green body produced by the present production process uses the powder particles recited in any one of the first to tenth aspects of the invention about the powder particles, each of the powder particles is a composite particle in which a small amount (a necessary amount) of the thermoplastic resin particles are composited with one large particle. Therefore, when a green body is formed by the present production process, since the green body is packed with the powder particles each having an extremely small amount of the thermoplastic resin particles loaded thereon, a green body is formed in which the thermoplastic resin particles are well dispersed without distribution unevenness. Moreover, upon heating the thermoplastic resin particles to melt, strength of bonding the powder particles to each other can be effectively improved, and such an effect is exerted on the entire green body, so the production process has an advantage that a strong green body having little variation in strength can be obtained.

According to the second aspect of the invention about the process for producing a green body, surface charge of large particles is controlled in liquid in a first surface charge control step, and surface charge of thermoplastic resin particles having a smaller particle size than the large particles is controlled in liquid in a second surface charge control step in order to attach the thermoplastic resin particles on the large particles treated in the first surface charge control step by electrostatic attraction. Then, in a compositing step, the large particles treated in the first surface charge control step and the thermoplastic resin particles treated in the second surface charge control step are mixed in liquid and composited by electrostatic attraction, thereby fabricating composite particles. Next, in a green body forming step, a green body is shaped by using the obtained composite particles, heated above a melting temperature of the thermoplastic resin particles contained in the green body, and then cooled. A green body is thus formed.

In the compositing step of the present production process, the resin particles are attached on the large particles dispersed in the liquid by electrostatic attraction. Therefore, the amount of the thermoplastic resin particles loaded on the large particles can be appropriately controlled by adjusting the amount of the thermoplastic resin added. As a result, a small amount (a necessary amount) of the thermoplastic resin particles can be precisely loaded on the large particles, and each of the obtained composite particles has a less variation in the amount of the thermoplastic resin particles loaded. Therefore, a green body is packed with the composite particles each having an extremely small amount of the thermoplastic resin particles loaded thereon. Thus, a green body is formed in which the thermoplastic resin particles are well dispersed without distribution unevenness. Moreover, strength of bonding the powder particles to each other can be effectively improved by melting the thermoplastic resin particles by heating, and such an effect is exerted on the entire green body, so the production process has an advantage that a strong green body having little variation in strength can be obtained.

According to the third aspect of the invention about the process for producing a green body, in addition to the advantages exhibited by the second aspect of the invention about the process for producing a green body, in a small particle surface control step, surface charge of small particles having easy sinterability or a function as an auxiliary sintering additive and a smaller particle size than the large particles is controlled so as to have an opposite polarity to that of surface charge of the large particles treated in the first surface charge control step. Then, in a precompositing step, composite particles of the large particles and the small particles are fabricated by mixing, in liquid, the small particles treated in the small particle surface charge control step and the large particles treated in the first surface charge control step and compositing these particles by electrostatic attraction. In the meanwhile, in the second surface charge control step, surface charge of the thermoplastic resin particles is controlled in liquid so as to have an opposite polarity to that of surface charge of the composite particles fabricated in the precompositing step. In the compositing step, the composite particles of the large particles and the small particles fabricated in the precompositing step is further composited with the thermoplastic resin particles treated in the second surface charge control step.

In order to composite the large particles and the small particles by electrostatic attraction, the small particles are treated so as to have surface charge of an opposite polarity to that of the large particles. For example, in a case of composite particles in which a sufficient amount of small particles are composited with the large particles, the thermoplastic resin particles having surface charge controlled to have an opposite polarity to that of the small particles can be selectively attached on the small particles by electrostatic attraction, in other words, composite particles having a structure in which the small particles are located on surfaces of the large particles and the thermoplastic resin particles are located on surfaces of the small particles can be fabricated precisely, simply and reliably.

Furthermore, for example, if surface charge of the composite particles of the large particles and the small particles is controlled and then these composite particles are composited with the thermoplastic resin particles whose surface charge have been controlled to have an opposite polarity to that of the composite particles of the large particles and the small particles, part of the thermoplastic resin particles can be loaded on the large particles by way of the small particles, and at the same time rest of the thermoplastic resin particles can be loaded on the surfaces of the large particles directly, i.e., not by way of the small particles. Thus, the present production process can control locations of the thermoplastic resin particles on the surfaces of the large particles by simple operations and form ternary composite particles having different structures as intended.

Moreover, the thermoplastic resin particles can be precisely loaded on the large particles only by dispersed in liquid. Therefore, without subjecting a binder and powder particles to such conventional severe conditions as being mixed with a strong shear force applied, the thermoplastic resin particles to serve as a binder can be loaded on the composite particles. Therefore, the production process have an advantage that a green body having a good strength can be formed with a small amount of the binder while keeping the structure of the composite particles.

According to the fourth aspect of the invention about the process for producing a green body, in addition to the advantages exhibited by the second aspect of the invention about the process for producing a green body, in a small particle surface charge control step, surface charge of small particles having easy sinterability or a function as an auxiliary sintering additive and a smaller particle size than the large particles is controlled so as to have an opposite polarity to that of surface charge of the large particles treated in the first surface charge control step. In a precompositing step, the small particles after subjected to the small particle surface charge control step and the large particles after subjected to the first surface charge control step are mixed in liquid and composited by electrostatic attraction, thereby fabricating composite particles of the large particles and the small particles. Then, in a surface charge recontrol step, surface charge of the entire composite particles of the large particles and the small particles fabricated in the precompositing step is further controlled. In the compositing step, the composite particles treated in the surface charge recontrol step are further composited with the thermoplastic resin particles treated in the second surface charge control step.

In this respect, the surface charge recontrol step is to control charge of the entire surfaces of the composite particles (large particles-small particles) fabricated in the precompositing step. When the small particles are attached on the large particle, apparent surface charge of the fabricated composite particles (large particles-small particles) may be weak, depending on the coverage ratio of the large particles with the small particles. Even in such a case, surface charge of the composite particles (large particles-small particles) can be controlled to have a determined polarity and a determined intensity in the surface charge recontrol step. The second surface charge control step is to control surface charge of the thermoplastic resin particles in liquid so as to have an opposite polarity to that of surface charge of the aforementioned composite particles (large particles-small particles). Therefore, in the compositing step, the thermoplastic resin particles controlled in the second surface charge control step are composited by suitable electrostatic attraction with the composite particles (large particles-small particles) whose surface charge has been controlled in the precompositing step and the surface charge recontrol step, thereby obtaining ternary composite particles having different structures.

According to the fifth aspect of the invention about the process for producing a green body, in addition to the advantages exhibited any one of the second to fourth aspects of the invention, since the green body forming step is to shape the green body by using a slurry in which the composite particles obtained in the compositing step are dispersed, dry the shaped green body and then heat the dried green body above the melting temperature of the thermoplastic resin particles, a dispersion medium of the slurry does not remain at the time of heating and effect of evaporation of the dispersion medium can be avoided.

In addition, the production process has an advantage that since shape of a green body can be easily maintained, for example, by shaping parts of the green body and drying and heating the green body every time one part of the green body is shaped, a complicated shaped body can be produced with high precision.

DESCRIPTION OF EMBODIMENTS

Preferred embodiments of the present invention will be hereinafter described with reference to the accompanying drawings. First, powder particles according to the present invention will be described.

Powder particles according to the present invention are to be used as raw material powder for producing a sintered body, and when a green body is formed by using the present powder particles, a green body having a good strength can be realized while reducing the amount of a binder resin.

Figure 1A:
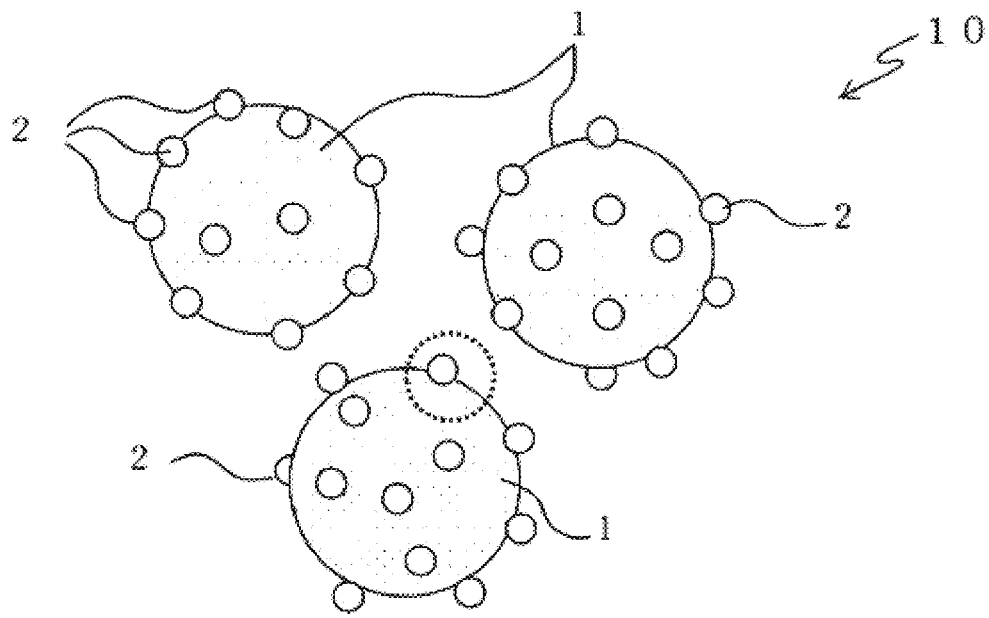
FIGS. 1(a)-1(c) are diagrams showing one example model of powder particles of the present invention.
Figure 1B:
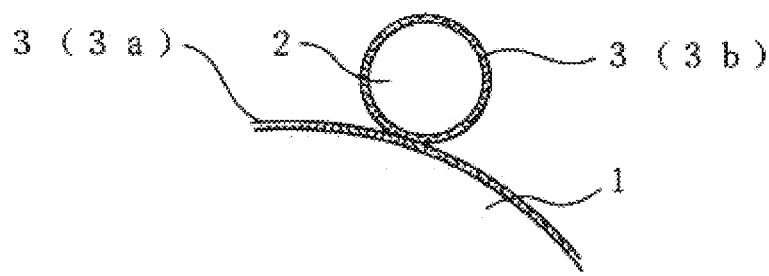
Figure 1C:
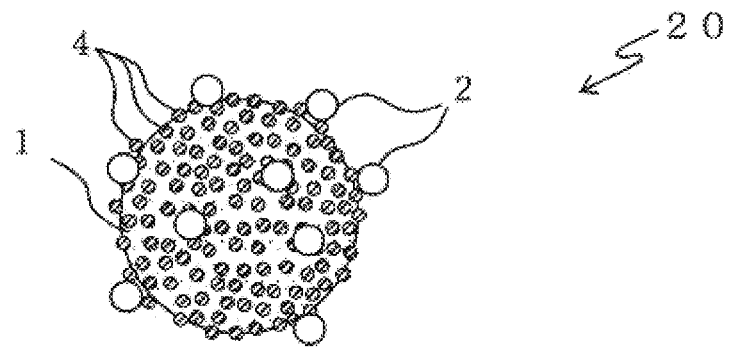

FIGS. 1(a)-1(c) are diagrams showing one example model of powder particles of the present invention. As shown in FIGS. 1(a)-1(c), the powder particles of the present invention have structures of composite particles 10, 20 in which large particles 1 having a relatively large size are composited with particles 2, 4 having a smaller size than the large particles 1.

FIG. 1(a) is composite particles 10 of large particles 1 and resin particles 2. The large particles 1 serve as a main component when a sintered body is produced by using the composite particles 10, and are sinterable powder.

In general, when powder is heated to a temperature at which solid phase diffusion occurs below a melting point of the powder, diffusion causes mass transfer between powder particles in contact with each other, so contact area of the particles increases and distance between the particles is shortened, that is, sintering occurs. Owing to this, strong bond is generated between the powder particles, and a dense object (a sintered body) is generated. The composite particles 10 are constructed so as to be capable of producing a sintered body upon sintering of the large particles 1. Therefore, in the composite particles 10, the large particles 1 can be primary particles, secondary particles as agglomerates of primary particles, or granule particles of these primary or secondary particles. Particles to be used as the large particles 1 or the resin particles 2 only need to be solid and have any outer shape, and can be spherical, round or aggregated particle.

Therefore, the large particles 1 need to have sinterability, and desirably have an average primary particle size (an average size of primary particles) of from 0.2 μm to 5 μm, preferably from 0.2 μm to 3 μm and more preferably from 0.2 μm to 1 μm. When the large particles 1 are aggregated particle, secondary particles, or granule particles, the large particles 1 can have a larger particle size than the aforementioned primary particles. For example, when the large particles 1 are aggregated particle, the large particles 1 can have an average primary particle size of not less than 1 μm, preferably from 800 μm to 1200 μm and more preferably from 900 μm to 1100 μm.

The resin particles 2 are a thermoplastic resin and serve as a binder for bonding the large particles 1 to each other in forming a green body by using the large particles 1. The resin particles 2 have a smaller size than the large particles 1 and are solid at room temperature and loaded in a manner to be scattered on surfaces of the large particles 1. That is to say, the resin particles 2 do not coat the surfaces of the large particles 1 but are placed on the surfaces of the large particles 1 while keeping the shape of solids with outer shape boundaries closed. The respective resin particles 2 are sparsely or densely scattered on the entire surfaces of the large particles 1 without great unevenness in distribution on the surfaces of the large particles 1. Furthermore, each of the composite particles 10 has about the same amount of the resin particles 2, and the amount of the resin particles 2 loaded is not much different with each of the composite particles 10.

Moreover, the amount of the resin particles 2 loaded is within a volume ratio range of from 1% to 5% with respect to the large particles 1, preferably from 2% to 5% and more preferably from 2% to 3%. When the resin particles are loaded at a volume ratio of 1% or more, a green body to be produced can have a relatively good strength. When the resin particles are loaded at a volume ratio of 2% or more, a green body having a sufficient strength can be produced. On the other hand, when the volume ratio of the resin particles loaded is 5% or less, adverse effects of gas generation or shrinkage in degreasing can be suppressed, and when the volume ratio is 3% or less, these adverse effects can be considerably reduced.

The volume ratio herein means a ratio of the volume of the resin particles to the volume of the large particles. When the volume ratio is, for example, from 1% to 5%, the total volume of the resin particles attached on the large particles is from 1/100 to 5/100 of the volume of the large particles when the volume of the large particles is regarded as 100. Therefore, the volume (size) of each one of the resin particles varies with the number of the resin particles to be composited with each of the large particles. When the large particles or the small particles have lumpy, irregular, or irregulared-shapes and there is a variation in their size, the large particles can be approximated to a spherical or disk shape and a ratio of the volume of the resin particles to the volume of the large particles calculated from an average particle size of the approximated sphere or disk can be used.

When the number of the resin particles 2 attached on (composited with) each of the large particles 1 is too small, the number of the resin particles 2 is too small to correspond to the number of points of contacting the large particles with each other. When the number of the resin particles 2 is too large, the volume of each one of the resin particles is too small and driving force for flowing on the surfaces of the large particles when the resin particles 2 are melted sometimes becomes insufficient. Since the total amount of the resin particles 2 attached on the large particles 1 is defined by volume ratio as mentioned above, the number and size (particle size ratio to the large particles) of each one of the resin particles 2 are controlled within that range.

The number of the resin particles 2 attached on each one of the large particles 1 depends on shape of the large particles, but the number is preferably about from 4 to 120, preferably about from 10 to 100, and more preferably about from 12 to 30. The number of the resin particles 2 attached on the large particles 1 can be appropriately adjusted in accordance with their particle size ratio or the like, but an extremely small number is not preferred in order to load almost the same number of the resin particles 2 on each one of the large particles 1. That is to say, as the number of the resin particles 2 is smaller, it is less easy to load the resin particles 2 in a roughly uniform dispersion on a surface of each one of the large particles 1. Moreover, when the resin particles 2 serve as a binder and a green body is formed by using the composite particles 10, an appropriate number of the resin particles are necessary in view of keeping strength of the green body. Therefore, a lower limit of the number of the resin particles 2 is defined as 4. For example, when the large particles 1 have an average particle size of 3 μm and the resin particles 2 have an average particle size of 0.4 μm, the volume ratio of the resin particles 2 can fall within the aforementioned range of about from 1% to 5% by controlling the number of the resin particles 2 within a range of from 4 to 21. These ranges of the amount of the resin particles 2 loaded by the number and the volume ratio are defined so that when the resin particles 2 are melted while a plurality of adjoining large particles 1 contact each other directly or indirectly by way of the resin particles 2, resin pools are formed in contact points and their suitable peripheral areas of the large particles 1.

FIG. 1(b) is an enlarged partial view of a part of the composite particles 10 in FIG. 1(a) surrounded by a broken-line circle. A thin layer 3 of a polymer electrolyte is formed on a surface of each of the large particles 1 and each of the resin particles 2. Specifically, a thin layer 3a of a polymer electrolyte is formed on a surface of each of the large particles 1 and a thin layer 3b of a polymer electrolyte is formed on a surface of each of the resin particles 2. A large particle 1 and a resin particle 2 contact each other by way of the polymer electrolyte layers 3a, 3b and the resin particle 2 is loaded on the surface of the large particle 1. Each one of the thin polymer electrolyte layers 3 has a thickness of not less than several nanometers and not more than 20 nm. Roughly, this thickness corresponds to a thickness of from a molecular monolayer to a stack of several molecular monolayers of the polymer electrolyte.

In the composite particles 10, one of a cationic polymer and an anionic polymer is deposited on surfaces of the large particles 1 (outermost surfaces of the thin layers 3a), while the other of the cationic polymer and the anionic polymer is deposited on surfaces of the resin particles 2 (outermost surfaces of the thin layers 3b). Although details will be mentioned later, owing to this structure, a small amount of the resin particles 2 can be precisely loaded on the large particles 1. Therefore, the obtained composite particles 10 respectively have similar structures and become raw material powder particles having good uniformity.

FIG. 1(c) is a composite particle 20 in which a large particle 1 is composited with small particles 4 and resin particles 2. Here, in the composite particle 20, the resin particles 2 are loaded on the large particle 1 by way of the small particles 4 in a manner to be located outside the small particles 4. That is to say, the small particles 4 and the resin particles 2 are overlappingly deposited in an order from the surface of the large particle 1.

In the composite particle 20, the small particles 4 are particles having a smaller particle size than the large particles 1 and serve as powder particles having easy sinterability or an auxiliary sintering additive. Easy sinterability means superior sinterability to that of the large particles 1. That is to say, the small particles 4 are a component to serve a role of promoting sintering. As mentioned above, sintering of powder is a phenomenon that mass diffusion at particle boundaries (boundary faces) generates a bond between powder particles in contact with each other, thereby producing a dense object. Since the smaller small particles 4 have a higher diffusion rate than the large particles 1, composite particles including small particles 4 have an improved sinterability than the large particles alone even when the small particles 4 are formed of the same material as the large particles 1. As a result, the composite particles 20 have advantages that an obtained sintered body can be improved in denseness, and that sintering can be done with less energy at a lower temperature.

It is to be noted that the phrase "have a higher diffusion rate than the large particles" means "have a higher rate of physical and chemical changes such as melting and solid phase diffusion at their firing temperature than the large particles".

The small particles 4 are roughly uniformly attached on the entire surfaces of the large particles 1 without great distribution unevenness. In order to secure strength and denseness of the sintered body, a sufficient amount of the small particles 4 need to be present at boundaries between the large particles. On the other hand, since the small particles 4 shrink due to sintering, a large amount of the small particles 4 located between the large particles increase a ratio of shrinkage caused by sintering. Therefore, in each of the composite particles 20, a one-particle-thick monolayer of the small particles 4 is formed on a surface of each one of the large particles 1. The coverage ratio of the surfaces of the large particles 1 with the small particles 4 is designed to range from 40% to 100%, preferably from 45% to 95%, and more preferably from 50% to 90%. The coverage ratio of surfaces of the large particles 1 is regarded as 100% when the small particles 4 are uniformly attached on the surfaces of the large particles 1 in a closest-packed structure and a one-particle-thick monolayer of the small particles 4 covers each one of the large particles.

For example, if the small particles are attached on each one of the large particles 1 at a coverage ratio of 100%, two small particles are present between adjoining two of the large particles. Owing to this, the small particles are always present between the adjoining large particles, sintering reaction can smoothly proceed. On the other hand, even if the small particles 4 are loaded at a coverage ratio of 100%, an excessively large amount of, i.e., more than two small particles 4 are not present between the large particles. Since sintering shrinkage is generally caused by proceeding of sintering (sintering of the small particles 4), the presence of an excess of the small particles 4 increases the shrinkage rate. However, by defining the structure as in the composite particles 20, presence of a great amount of the small particles 4 between the large particles can be avoided and both a sufficient sinterability and shrinkage rate suppression can be realized. It should be noted that presence of only one small particle 4 between the large particles promotes a sintering reaction and even if there is some distance between the small particles on the large particles, the sintering reaction is promoted. Therefore, about 40% is sufficient as the coverage ratio of the large particles with the small particles and an upper limit of the coverage ratio is 100%.

Moreover, the small particles 4 have an easier sinterability with an decreasing particle size. In view of sinterability, the small particles 4 having an average particle size of not more than 50 nm are preferred. On the other hand, the small particles 4 have a lower handling workability with a decreasing particle size. Therefore, preferably used small particles have an average particles size of from 50 nm to 150 nm, more preferably from 80 nm to 120 nm, and further more preferably from 95 nm to 110 nm. The small particles 4 can be granulated powder, and a preferred particle size of such granulated small particles falls within the same range as above. Particles used as the small particles 4 only need to be solid and have any outer shape, and can be spherical, round or aggregated particle.

Here, in order to attain suppression of sintering shrinkage in addition to an improved denseness brought by the improved sinterability, the composite particles 20 employ, as the large particles 1, primary particles having an average particle size large enough not to sinter at a normally determined sintering temperature (not to sinter at a sintering temperature of the small particles 4). In this case, only the small particles 4 sinter. Since sinterability depends on sintering temperature and chemical composition, the particle size of the large particles 1 can be appropriately selected in accordance with firing conditions and the like, and can be from 1 μm to 5 μm, for instance.

The resin particles 2 have a larger size than the small particles 4 but, as in the composite particles 10, have a smaller size than the large particles 1 and are loaded scatteredly on surfaces of the large particles 1. That is to say, the resin particles 2 do not coat the surfaces of the large particles 1 but are constructed to be located on the surfaces of the large particles 1 (by way of the small particles 4) while keeping the shape of solids with outer shape boundaries closed. The volume ratio and number of the resin particles 2 attached on the large particles 1 are about the same as those of the composite particles 10. It is to be noted that in the powder particles of the present invention, the phrase "loaded on surfaces of the large particles" means "attached and present directly or indirectly on surfaces of the large particles 1". This is a concept not limited to "in contact with real surfaces of the large particles" alone but including "attached to real surfaces of the large particles 1 with any substance present therebetween".

It should be noted that all of the resin particles 2 can be loaded on the large particles 1 by way of the small particles 4, and part of the resin particles 2 can be loaded on the large particles by way of the small particles 4. When part of the small particles 4 are loaded on the large particles 1, other parts of the small particles 4 are loaded in the same level as the small particles on the surfaces of the large particles 1. Moreover, all of the resin particles 2 can be loaded in the same level as the small particles on the surfaces of the large particles 1.

Although not shown, in these composite particles 20, a thin layer of a polymer electrolyte is formed on a surface of each of the large particles 1, the resin particles 2 and the small particles 4, and each one of the particles contacts another particle by way of the polymer electrolyte layers and the small particles 4 and the resin particles 2 are loaded on the surfaces of the large particles 1. Especially when the small particles 4 are nanosized particles, a polymer electrolyte layer can be omitted.

The respective resin particles 2 are sparsely or densely scattered on the entire surfaces of the large particles 1 without great distribution unevenness. Furthermore, each one of the composite particles 20 has about the same amount of the resin particles 2 and the amount of the resin particles loaded does not greatly differ with each of the composite particles 20.

Moreover, each of the composite particles 20 has about the same amount of the resin particles 2 and about the same amount of the small particles 4 loaded and these amounts do not greatly differ with each of the composite particles 20. Therefore, when a green body is formed by using the composite particles 20, shrinkage is suppressed while sinterability is improved by use of the small particles 4, so a sintered body having high denseness and good dimensional accuracy can be obtained.

Although illustrated as a model in the shape of a sphere in FIGS. 1(a)-1(c) and referred to as "particles" for convenience, the large particles 1 in the powder particles according to the present invention are not limited in geometric configuration and can be spherical, acicular, clumpy, columnar, flaky, plate-like, and so on.

The large particles of the powder particles according to the present invention are powder used for a sintered body and are an inorganic material such as ceramic, metal, an alloy and cermet. In the present invention, a sintered body can be formed either by sintering the large particles in themselves at a sintering temperature or by sintering the small particles and substantially not sintering the large particles. However, a main component of a sintered body to be obtained is designed to be the large particles. The phrase "a main component of a sintered body" means "a component which occupies more than 50% by volume of a sintered body".

Examples of the ceramic powder include a variety of oxides, nitrides, and carbides. Oxides can be either single oxides or composite oxides. Examples of the ceramic powder include alumina, zirconia, silicon nitride, silicon carbide, magnesia, calcia, titania, vanadium oxide, spinel, and ferrite. These ceramics can be used singly or in a mixture. These ceramics can be used in the form of a solid solution.

Furthermore, examples of the metal powder include iron-based, copper-based, aluminum-based, nickel-based, molybdenum-based, titanium-based, and tungsten-based powders, but the metal powder is not limited to these. These metals can be used singly, in a mixture, or as an alloy.

The alloy powder can be a variety of alloys and examples of the alloy powder include iron alloys, alloy steels, copper alloys, nickel alloys, aluminum alloys, and cemented carbides. Examples of the cermet powder include TiC—Ni cermet, $Al_2O_3$—Cr cermet, $Al_2O_3$—Fe cermet. However, the cermet powder is not limited to these.

Although illustrated as a model in the shape of a sphere in FIG. 1 and referred to as "particles" for convenience, the resin particles in the powder particles according to the present invention are not limited in geometric configuration, and can be spherical, acicular, clumpy, columnar, flaky, plate-like, fibrous, and so on.

The resin particles in the powder particles according to the present invention are a thermoplastic resin which is solid at room temperature. Examples of such a thermoplastic resin include olefin-based resins such as polyethylene, polypropylene, poly-1-butene, poly-4-methyl-1-pentene, cyclic polyolefin and their modified resins; styrene-based resins such as polystyrene, styrene acrylonitrile copolymer (AS resin), and styrene acrylonitrile butadiene copolymer (ABS resin); acryl-based resins such as polymethacrylate and polyacrylate; ester-based resins such as polyethylene terephthalate and polybutylene terephthalate; vinyl-based resin such as polyvinyl chloride, polyvinyl acetate and ethylene vinyl acetate copolymer; vinylalcohol-based resins such as polyvinyl alcohol; cellulose-based resins such as ethyl cellulose; amide-based resins such as nylon 6 and nylon 12; fluorine-based resins such as polyvinylidene fluoride; polyacetal-based resins; polyvinylidene chloride; and polycarbonate. Furthermore, as long as a temperature condition is right, examples of such a resin can include polysulfone, polyphenylene sulfide, polyamide imide and polyether ether ketone.

Especially preferred among these thermoplastic resins are those having a melting point of not more than 200 deg. C. Examples of such resins include acryl-based resins, polyolefin-based resins, vinyl-based resins, vinylalcohol-based resins, acetal-based resins, cellulose-based resins, and styrene-based resins. Acryl-based resins and vinylalcohol-based resin are more preferred. These can be used singly or in a mixture of two or more of them.

These thermoplastic resins can be used singly or in a mixture of a plurality of them. These thermoplastic resins can be a homopolymer or a copolymer. These thermoplastic resins can be variously modified. These thermoplastic resins can be those produced by compounding plural kinds of resins beforehand by polymer alloying or other techniques. For example, when a resin as a single body has a high melt viscosity, the resin can be alloyed with another resin to improve flowability and then suitably used as the thermoplastic resin of the present invention.

More preferably the thermoplastic resin is insoluble to and dispersable in an aqueous liquid. When the thermoplastic resin is poor in dispersibility, the thermoplastic resin can undergo hydrophilic treatment by a common procedure in order to improve wettability.

As long as they can improve sinterability, the small particles of the powder particles according to the present invention can be either of the same material as the large particles or of a different material from the large particles. Specifically, the small particles can be the same or a different kind of ceramics, glass, metal, alloys, cermet or a variety of auxiliary sintering additive s as or from the large particles.

When the small particles are ceramic, metal, an alloy or cermet, the small particles can be of the same material as the large particles. Examples of the glass include glass formed by using at least one of $SiO_2$, $B_2O_3$, $P_2O_5$, $GeO_2$, $BeF_2$, $As_2S_3$, $SiSe_2$ and $GeS_2$ as a skeleton and containing $TiO_2$, $TeO_2$, $Al_2O_3$, $Bi_2O_3$, $V_2O_5$, $Sb_2O_5$, PbO, CuO, $ZrF_4$, $AlF_3$, $InF_3$, $ZnCl_2$, and/or $ZnBr_2$. Examples of the auxiliary sintering additive include $SiO_2$, MgO, CaO, $TiO_2$, $V_2O_5$, CuO, $Bi_2O_3$, $B_2O_3$, $Y_2O_3$, $La_2O_3$, $Sm_2O_3$, and $Er_2O_3$, but the sintering additive is not limited to these.

The polymer electrolytes held by the powder particles of the present invention are polymers which separate into electrically charged ions in water as mentioned later, and are classified into a cationic polymer to be positively charged, and an anionic polymer to be negatively charged.

An example of the cationic polymer is poly(diallyldimethylammonium chloride)(PDDA). Other examples of the cationic polymer employable in the present invention include polyethyleneimine (PEI), polyvinylamine (PVAm), and poly(vinylpyrrolidone N,N-dimethylaminoethyl acrylate) copolymer. However, these are just examples of the cationic polymer and the cationic polymer is not limited to these. The cationic polymer can use, for example, water, an aqueous sodium chloride solution, an alcohol-based organic solvent, and a mixture thereof as a solvent.

An example of the anionic polymer is polystyrene sulfonic acid (PSS). Other examples of the anionic polymer employable in the present invention include polyvinyl sulfate (PVS), polyacrylic acid (PAA), poly methacrylic acid (PMA), and their alkali metal salts and their ammonium salts. However, these are just examples of the anionic polymer and the anionic polymer is not limited to these. The anionic polymer can use, for example, water, an aqueous sodium chloride solution, an alcohol-based organic solvent and a mixture thereof as a solvent.

Since it is only necessary in the present invention to composite the large particles, the small particles and the resin particles, a variety of ionic surfactants can be employed instead of the polymer electrolytes. Besides, for example, when the small particles are very small, what are called, nanosized particles, and are formed of a different material from that of the large particles, the large particles and the small particles can be composited by controlling the pH so that surface charge of the large particles and that of the small particles have different polarities in water. Therefore, in such a case, the aforementioned polymer electrolytes or surfactants can be omitted.

The powder particles of the present invention are used as a raw material of a sintered body. In production of a sintered body, a general process is to shape a green body (an unfired shaped body) as an original form of a sintered body, and sinter the green body to obtain a sintered body. Shaping of the green body can employ not only injection molding or extrusion molding but also a technique of mixing raw material powder with a binder resin and press molding the mixture, a technique of preparing a slurry by mixing raw material powder with a solvent and resin and casting or sheet molding the slurry, etc. These years, green body shaping is also tried by additive manufacturing using a 3D printer. With any technique, raw material powder is integrated (packed) to form a green body. The powder particles of the present invention are particularly suitable for press molding, casting and additive manufacturing.

Figures 2A, 2B, 2C:
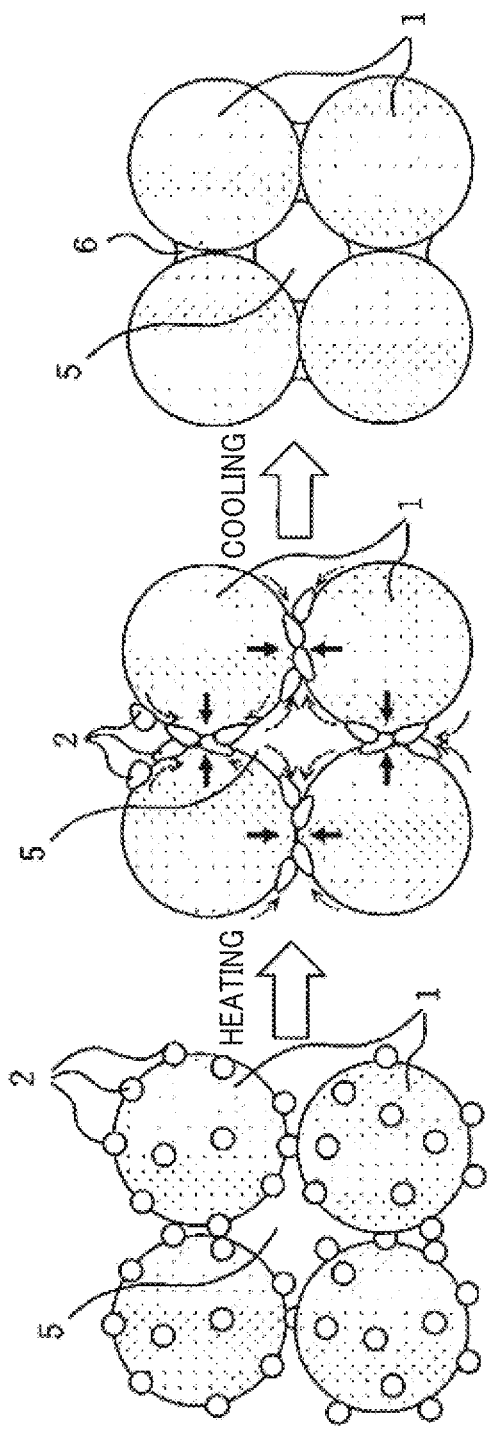
FIGS. 2(a)-2(c) are explanatory diagrams schematically showing a model of estimated actions of resin particles in forming a green body by using powder particles of the present invention.

FIGS. 2(a) and 2 (b) are explanatory diagrams schematically showing estimated actions of the resin particles in forming a green body by using the powder particles of the present invention. It should be noted that in FIGS. 2(a) and 2(b), explanation will be made by using the composite particles 10 as a model.

FIG. 2(a) schematically shows that the composite particles 10 are integrated (packed) in a certain shape. One composite particle 10 contacts adjoining composite particles 10 directly or indirectly by way of the resin particles 2. In general, when the particles are packed, voids 5 are usually generated. A part at which a composite particle 10 directly or indirectly contacts another adjoining composite particle is a contact point (including a point at which the composite particle 10 is closest to another adjoining composite particle) and a small range extending from the contact point to its close periphery is a contact point peripheral area.

FIG. 2 (b) shows that the composite particles 10 in the state shown in FIG. 2(a) is heated to a melting temperature of the resin particles 2. Upon heating, the resin particles 2 liquefy, flow on the surfaces of the large particles 1, and are drawn (are moved in the direction indicated by the broken arrows in FIG. 2(b)) by a capillary phenomenon into small gaps between adjoining large particles 1 (as a result, resin pools are formed). Moreover, at this time, force based on self assembling is applied on the large particles 1 in a direction to attract each other (in the directions indicated by the solid arrows in FIG. 2(b)). Therefore, interparticle distance between adjoining large particles 1 is shortened and the large particles 1 are densely packed.

Since the voids 5 are relatively large holes, their capillary force is small. Therefore, the liquefied resin particles 2 are stored in the small gaps between the adjoining large particles (contact point peripheral areas). When the amount of the resin particles exceeds storage capacity of the small gaps between the large particles, the molten resin is assumed to flow into the voids 5. However, the composite particles 10 contain the resin particles 2 only in such an amount to be sparsely or densely distributed on the surfaces of the large particles 1 (in a volume ratio of from 1% to 20%, preferably from 1% to 5% with respect to the large particles 1). That is to say, when a green body is shaped by using the composite particles 10, the green body does not contain an amount of the resin (the binder) large enough to fill the voids 5. Upon controlling the amount of the resin particles 2 so as to have the abovementioned desired volume ratio, resin pools can be formed in the contact point peripheral areas and a remarkable excess of molten resin cannot be present in other areas than those.

FIG. 2(c) shows that the composite particles 10 are cooled after heated as shown in FIG. 2(b). The resin melted and stored in the small gaps between the adjoining large particles 1 is solidified, while keeping the position. That is to say, resin necks 6 are formed at parts where one large particle 1 is closest to or in contact with another large particle 1. The green body is formed in any three-dimensional shape and needs the packed raw material powder particles to bond to each other in order to keep the shape. In this respect, it is assumed to be most effective for bonding adjoining powder particles to each other to sufficiently fix contact point areas (or proximal point areas) of these particles. In other words, it is assumed to be sufficient to bond peripheries of the contact points (or the proximal points) of the large particles 1 with the necks 6 and that resin filled in the voids 5 does not greatly contribute to bonding force of the large particles 1.

In general, the resin is used in a green body as a binder for bonding the large particles. Resin not contributing to bonding of the large particles is an excess. In consideration of effect at the time of degreasing, it is demanded that the excess of the resin is as little as possible. However, in a conventional green body, resin cannot be selectively distributed to contact point areas (or proximal point areas) of raw material powder particles. Therefore, a small resin content cannot provide sufficient bonding force.

Upon thus using the powder particles of the present invention, the resin (the binder) can be distributed to effective positions for bonding the large particles, as shown in FIG. 2(c). Thus, a strong green body can be obtained with a minimum necessary amount of the binder.

Figure 3:
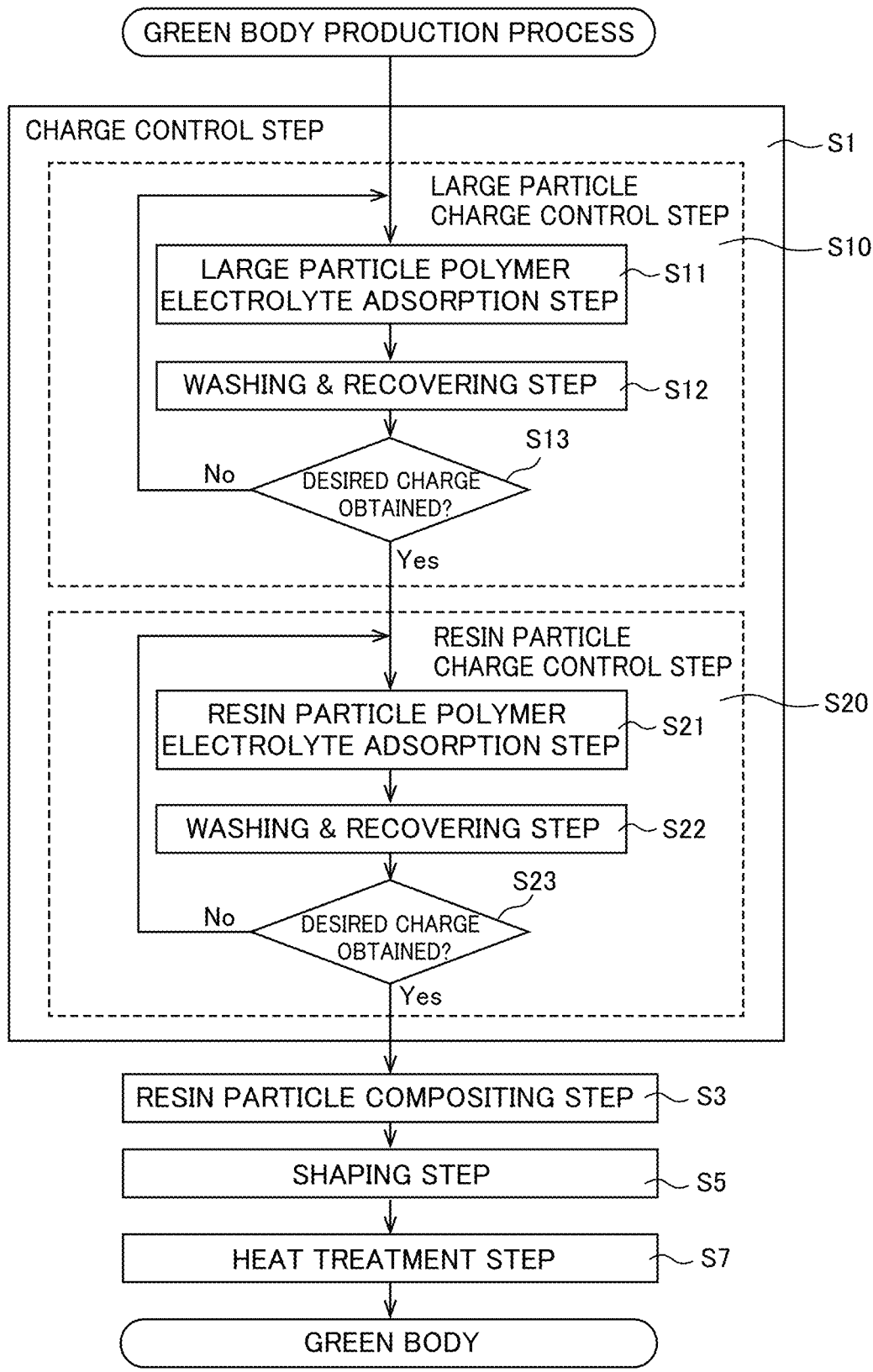
FIG. 3 is a chart showing steps of a process for producing a green body of a first embodiment of the present invention.

Next, a process for producing a green body by using the powder particles of the present invention having the abovementioned structure will be described with reference to FIG. 3. FIG. 3 is a flow chart schematically showing steps of a process for producing a green body according to a first embodiment. The first embodiment is a process for producing a green body by using, as raw material powder particles, the abovementioned composite particles 10 in which the large particles are composited with the thermoplastic resin particles.

As shown in FIG. 3, the green body production process comprises a charge control step (S1) of controlling surface charge of particles to serve as constituent materials of the powder particles, a resin particle compositing step (S3) of fabricating composite particles with resin particles, a shaping step (S5), and a heat treatment step (S7). A green body is produced by performing these steps.

The charge control step (S1) is a step of controlling surface charge of each kind of particles to be composited. Since composite particles of the large particles and the resin particles which are smaller than the large particles are fabricated in the present embodiment, control of surface charge is performed on the large particles and the resin particles, respectively. Therefore, the charge control step (S1) includes a large particle charge control step (S10) of controlling surface charge of the large particles and a resin particle charge control step (S20) of controlling surface charge of the resin particles. For the control of surface charge, it is desired to use a cationic polymer and an anionic polymer, which are polymer electrolytes.

The large particles and the resin particles have different surface charges depending on their materials. If particles originally have positive surface charge, polarity of the surface charge can be converted to negative by making the particles adsorb an anionic polymer. In contrast, if particles have negative surface charge, polarity of the surface charge can be converted to positive by making the particles adsorb a cationic polymer. It should be noted that surface charge mentioned herein is apparent potential of the particles, and when one or more layers having polarity are deposited on surfaces of the particles, charge of an outermost layer is regarded as surface charge.

In the charge control step (S1), in order to keep charge density constant and improve its intensity, it is more preferred to laminate a cationic polymer and an anionic polymer by plural times of treatments by alternately using a cationic polymer and an anionic polymer so that at least two polymer electrolyte layers are formed on a surface of each of the particles.

Moreover, when dispersibility of the particles is harmed by bridging flocculation caused by absorption of a polymer electrolyte, an ionic surfactant can be used in place of a polymer electrolyte. When the ionic surfactant is used, particle surfaces absorb the ionic surfactant and are charged. When plural times of treatments are applied, a combination of a polymer electrolyte and an ionic surfactant can be used.

In the large particle charge control step (S10), first, the surfaces of the large particles are coated with a polymer electrolyte having an opposite polarity to that of surface charge of the large particles (either one of a cationic polymer and an anionic polymer) in a large particle polymer electrolyte adsorption step. Specifically, the polymer electrolyte is adsorbed on the surfaces of the large particles by introducing, agitating and dispersing the large particles in a solution of the polymer electrolyte in liquid (water, an aqueous liquid, an alcohol-based organic solvent, etc.) (S11). The liquid used ionizes the polymer electrolyte and at the same time serves as a dispersion medium of the particles.

In this respect, the solution contains an excessive amount of the polymer electrolyte when compared to the amount of the large particles introduced so that a sufficient amount of the polymer electrolyte is adsorbed on the large particles. Then, in a washing and recovering step, the excess of the polymer electrolyte is removed by a washing operation and then an operation of separating liquid and the large particles, that is to say, an operation of recovering the large particles by conducting an appropriate operation such as sedimentation, centrifugal separation, and filtering (S12). Then whether a desired surface charge is obtained or not is confirmed (S13). If it is obtained (S13: YES), charge control treatment of the large particles is finished. In contrast, if the desired surface charge is not obtained (S13: NO), the process returns to the large particle polymer electrolyte adsorption step (S11) and the operations are repeated until the desired surface charge is obtained. It should be noted that since surface charge of the large particles has an opposite polarity to that of a former surface charge of the large particles in a repeated large particle polymer electrolyte adsorption step (S11), a polymer electrolyte to use has an opposite polarity to that of the formerly used polymer electrolyte. The large particles which finished the charge control of the present step (S10) is stocked in the form of powder or a suspension in order to be used in the resin particle compositing step (S3) mentioned later.

In this respect, later compositing of the large particles with the resin particles can be well performed by keeping charge density of the large particle surfaces constant and improving its intensity. Therefore, whether a desired charge intensity is obtained or not is determined. Whether a desired surface charge is obtained or not can be determined by measuring zeta potential of the recovered large particles. Since a sufficient surface charge can be obtained by forming a plurality of polymer electrolyte layers by alternately using a cationic polymer and an anionic polymer, the abovementioned operation is scheduled to be repeated a predetermined number of times, and the judgment at S13 can be to determine whether treatment repetition times reaches a predetermined number or not. These steps render the large particles a sufficient charge for adsorbing the resin particles electrostatically and securely in later compositing.

The resin particle charge control step (S20) is a step of coating resin particle surfaces with a polymer electrolyte. That is to say, particle surface charge control is performed by using the resin particles as target particles to be treated. Therefore, as in the large particle charge control step (S10), surface charge of the resin particles is controlled by performing a resin particle polymer electrolyte adsorption step (S21) of making the resin particles adsorb a polymer electrolyte, a washing and recovering step (S22) of washing and recovering the resin particles, and a step (S23) of determining whether a desired surface charge is obtained or not. It should be noted that the kind of polymer electrolytes and the number of treatment repetition times are selected so that polarity of outermost surfaces of the finally recovered resin particles has an opposite polarity to that of outermost surfaces of the large particles which already finished the treatments of the large particle charge control step (S10). Thus resin particles having suitable surface charge for compositing (a desired surface charge) are obtained. The resin particles which finished the charge control of the present step (S20) is stocked in the form of powder or a suspension in order to be used in the resin particle compositing step (S3) mentioned later.

When washing is not necessary because a polymer electrolyte is added without excess or deficiency and an excess of the polymer electrolyte is not generated in final treatment of each of the large particle charge control step (S10) and the resin particle charge control step (S20), an operation of recovering the large particles or the resin particles from liquid can be omitted and the liquid in which the large particles or the resin particles are dispersed can be used as it is in the following resin particle compositing step (S3).

The resin particle compositing step (S3) is a step of mixing the large particles obtained by performing the large particle charge control step (S10) and the resin particles obtained by performing the resin particle charge control step (S20) in liquid (water, an aqueous liquid, or an alcohol-based organic solvent which serves as a dispersion medium of the particles), and bonding and compositing the large particles and the resin particles by electrostatic attraction. Specifically, for example, dispersion solutions of the large particles and the resin particles recovered in the charge control step (S1) are respectively prepared and then these dispersion solutions are mixed and agitated, thereby fabricating composite particles. Then, after appropriately washing, the composite particles are recovered by carrying out appropriate operations such as sedimentation, centrifugal separation, or filtering. When the liquid containing the composite particles is used as it is as a slurry in the shaping step (S5), the operation of recovering the composite particles can be omitted.

In the composite particles thus obtained, upon controlling the amount and concentration of the resin particles added with respect to the large particles in the resin particle compositing step (S3), an appropriate amount of the resin particles (an amount to be placed sparsely or densely on the surfaces of the large particles) can be attached on the large particles. Moreover, since compositing reaction by electrostatic attraction in liquid occurs relatively uniformly, almost the same amount of the resin particles can be loaded on each of the large particles.

The shaping step (S5) is a step of forming the composite particles obtained by performing the resin particle compositing step (S3) as raw material powder particles into a desired shape before firing. Examples of shaping technique include press molding of filling and pressing the composite particles in dies for shape forming, casting using a slurry containing the composite particles, tape forming using a doctor blade, and additive manufacturing using a 3D printer. When a slurry is used, drying is carried out to form a green body having an original shape of a sintered body.

The heat treatment step (S7) is a step of heating the green body shaped in the shaping step (S5) above a melting temperature of the resin particles, which are a thermoplastic resin, and then cooling the heated body, thereby increasing strength of the green body. Upon undergoing the heat treatment step (S5), the resin particles are melted and the molten resin are drawn into small gaps between adjoining large particles as mentioned above. Then, since the resin particles are solidified by cooling, the resin gathers around areas in each of which one large particle is closest to or in contact with another large particle, and effectively bonds the large particles to each other. Therefore, a strong green body can be formed.

Heating temperature can be set by using melting temperature and melt viscosity of the resin as indices. Heating time is appropriately adjusted in accordance with structure, size and thickness of a green body. Heating can be done by a known method, for example, by appropriately employing indirect heating such as heating by an electric furnace, a laser, an infrared heater or a dryer, or contact heating such as heating by a hot press or an iron. It is to be noted that since hot pressing is to fill raw material powder particles in dies and thermoforming the particles, the shaping step (S5) and the heat treatment step (S7) are integrally performed.

Figure 4:
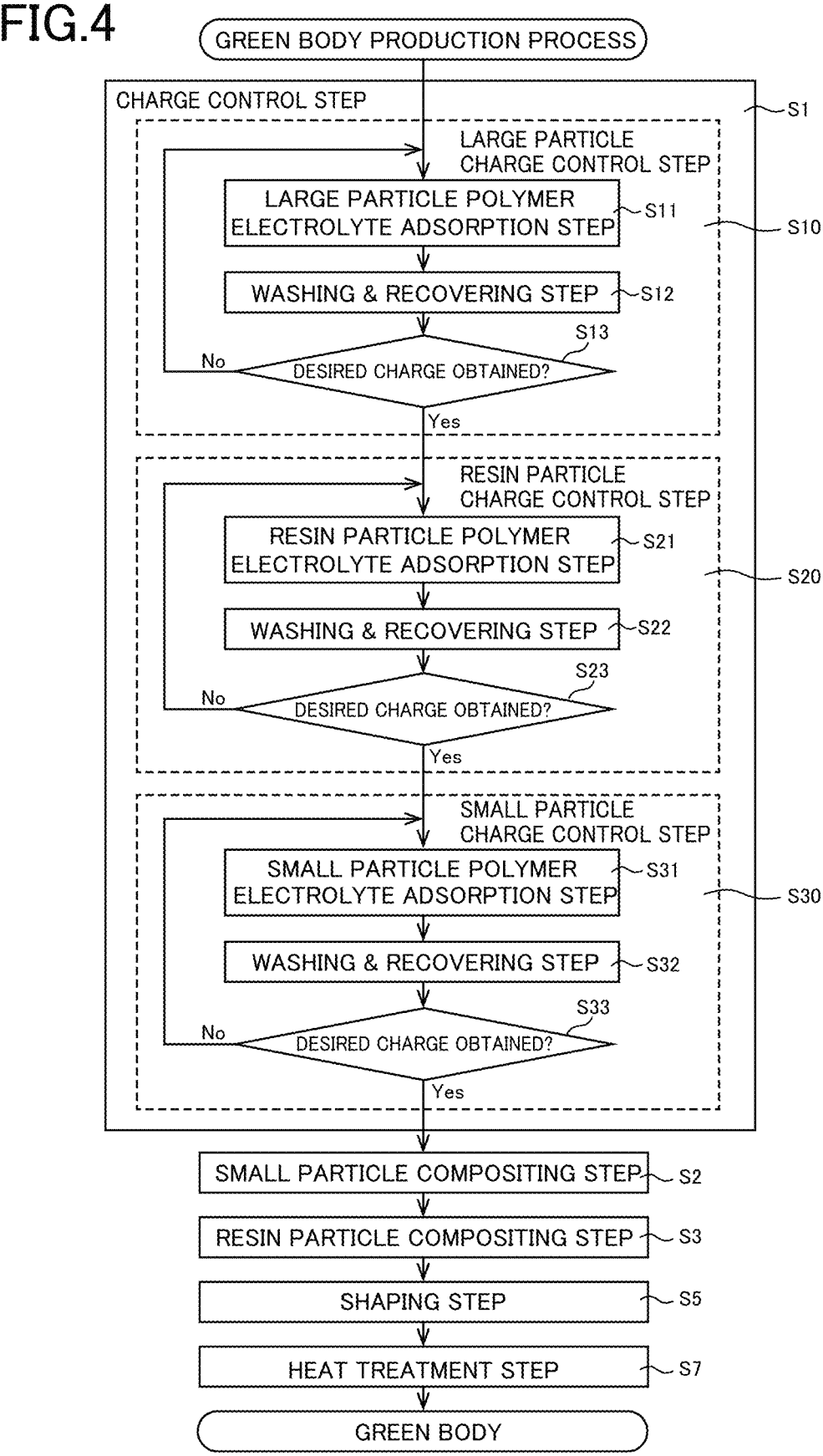
FIG. 4 is a chart showing steps of a process for producing a green body of a second embodiment of the present invention.

Next, a second embodiment of the process for producing a green body by using the powder particles of the present invention will be described with reference to FIG. 4. FIG. 4 is a flow chart schematically showing steps of the process for producing the green body according to the second embodiment. The second embodiment is a process for producing a green body by using, as raw material powder particles, the ternary composite particles 20 in which the large particles are composited with the small particles and then further composited with the thermoplastic resin particles. It is to be noted that the same reference signs are assigned to the same parts as those of the abovementioned first embodiment and their description will be omitted.

As shown in FIG. 4, the green body production process comprises a charge control step (S1) of controlling surface charge of particles to serve as constituent materials of the powder particles, a small particle compositing step (S2) of compositing the small particles and the large particles, a resin particle compositing step (S3) of compositing the composite particles with the resin particles, a shaping step (S5), and a heat treatment step (7). A green body is produced by performing these steps.

In the second embodiment, since the composite particles are a composite of three kinds of particles, i.e., the large particles, the small particles and the resin particles, surface charge of the small particles is controlled in addition to surface charge of the large particles and the resin particles in the charge control step (S1). Therefore, the charge control step (S1) includes not only a large particle control step (S10) of controlling surface charge of the large particles and a resin particle charge control step (S20) of controlling surface charge of the resin particles but also a small particle surface charge control step (S30) of controlling surface charge of the small particles. The powder particles of the composite particles obtained in the second embodiment are fabricated by using, as raw material powder particles, composite particles of large particles (1 μm to 5 μm) having a particle size large enough substantially not to sinter at a sintering temperature of small particles, fine small particles of a nanosize (50 nm to 150 nm) having easy sinterability, and resin particles.

The small particle charge control step (S30) is a step of controlling surface charge of the small particles. In the present embodiment, as in the large particle charge control step (S10) and the resin particle charge control step (S20), the small particle control step (S30) performs treatment to coat surfaces of the small particles with a polymer electrolyte. Therefore, as in the large particle charge control step (S10) and so on, surface charge of the small particles is controlled by performing a small particle polymer electrolyte adsorption step (S31) of making the small particles adsorb polymer electrolyte, a washing and recovering step (S32) of washing and recovering the small particles, and a step (S33) of determining whether a desired charge is obtained or not.

The kind of polymer electrolytes and the number of treatment repetition times are selected so that surface charge of finally recovered small particles has an opposite polarity to that of surface charge of the large particles which already finished the treatments of the large particle charge control step (S10). Thus obtained are small particles having a suitable surface charge for compositing (a desired surface charge). The small particles which finished charge control of the present step (S30) are stocked in the form of powder or a suspension, in order to be used in the small particle compositing step (S2) mentioned later.

Since the first embodiment is to composite the large particles and the resin particles, the resin particle charge control step (S20) controls surface charge of the resin particles so as to have an opposite polarity to that of the large particles. In contrast, since in the second embodiment the resin particles are attached on the large particles after the small particles are attached, the resin particle charge control step (S20) controls surface charge of the resin particles so as to have an opposite polarity to that of surface charge of the composite particles of the large particles and the small particles to be fabricated in the small particle compositing step (S2) mentioned later.

When the small particles are of a different material from that of the large particles, different surface charges can be given to the large particles and the small particles in water by controlling the pH. In such a case, without using the abovementioned polymer electrolyte or the surfactant, the small particles can be composited with the large particles only by controlling the pH. Being nanosized particles, the small particles are attached on the large particles with a sufficient adhesive force even when composited with the large particles only by pH control.

Subsequently, in the small particle compositing step (S2), the large particles obtained by performing the large particle charge control step (S10) and the small particles obtained by performing the small particle charge control step (S30) are mixed in liquid (water, an aqueous liquid, or an alcohol-based organic solvent), and bonded and composited by electrostatic attraction. Specific technique can be similar to the abovementioned techniques of the resin particle compositing step (S3) of the first embodiment. It is to be noted that the small particles can be attached on the large particles in an amount more than necessary to neutralize surface charge of the large particles by oversaturated adsorption, and the small particles can be attached on the large particles at a coverage ratio of more than 90%. Upon controlling concentration of the small particles added (small particle concentration in the suspension) and the amount of the small particles added, the amount of the small particles attached on the surfaces of the large particles can be controlled in a range of from several percent to 100%.

In this small particle compositing step (S2), in view of sinterability, the small particles are controlled to occupy the surfaces of the large particles 1 at a coverage ratio of from 40% to 100%, preferably from 50% to 95%, and more preferably from 60% to 90%.

If composite particles are fabricated in which the small particles in an amount to exceed a neutralization point of surface charge of the large particles (at a coverage ratio of 60% or more) are composited with the large particles, apparent surface charge of such composite particles has the polarity of the small particles.

Subsequently, the resin particles are composited in the resin particle compositing step (S3). Although the resin particles are composited with the large particles in the first embodiment, in the second embodiment the composite particles of the large particles and the small particles are used in place of the large particles, and the resin particles are composited with these composite particles.

When surface charge of the composite particles acquires an opposite polarity to that of the large particles (the polarity of the small particles) in the small particle compositing step (S2) as mentioned above, in the resin particle charge control step (S20) surface charge of the resin particles is controlled so as to have an opposite polarity to that of the small particles. As a result, in the resin particle compositing step (S3), composite particles are generated in which the resin particles are further composited with the composite particles of the large particles and the small particles. In this respect, since surface charge of the resin particles has been controlled to have the same polarity as that of the large particles, some parts of the surfaces of the large particles where the small particles are not attached are exposed, the resin particles are not directly attached on such parts of the surfaces of the large particles but selectively attached on the small particles. Thus obtained are ternary composite particles in which the resin particles are loaded on the large particles by way of the small particles.

In the small particle compositing step (S2), apparent surface charge of the composite particles of the large particles and the small particles is sometimes weakened depending on a coverage ratio of the large particles with the small particles, for example, in a case where the small particles in an amount to slightly exceed the neutralization point are attached on the large particles. In such a case, electrostatic attraction between the composite particles and the resin particles is also weakened and a problem may occur in compositing. In this case, in the resin particle compositing step (S3), the composite particles obtained in the small particle compositing step (S2) is subjected to a pretreatment to coat the entire composite particles with a polymer electrolyte in a similar technique to the technique of the charge control step (S1) (this is a surface charge recontrol step.)

In this pretreatment step (the surface charge recontrol step), the treatment is applied so that a plurality of polymer electrolyte layers are deposited and an outermost polymer electrolyte layer (surface charge of the composite particles) has the same polarity as the surface charge of the small particles given in the small particle polymer electrolyte adsorption step (S31). As a result, parts of the surfaces of the large particles not covered with the small particles (the exposed surfaces) have the same polarity as the surfaces of the small particles attached on the large particles. Subsequently, the composite particles are further composited with the resin particles whose surface charge has been controlled to have an opposite polarity to that of the small particles. Thus obtained are ternary composite particles in which the large particles, the small particles and the resin particles are composited.

In the obtained composite particles, part or all of the resin particles are loaded on the large particles by way of the small particles. How the resin particles are located varies with a coverage ratio of the surfaces of the large particles with the small particles. For example, since the gaps between the small particles become smaller with a higher coverage ratio, even though the surface charge of the large particles and that of the small particles have opposite polarities to each other, most of the resin particles cannot enter the gaps between the small particles and are attached on the small particles, though depending on the particle size of the resin particles. In contrast, since the gaps between the small particles become larger with a lower coverage ratio, a greater amount of the resin particles are attached on the surfaces (the exposed surfaces) of the large particles.

A green body is produced by using the composite particles obtained by this resin particle compositing step (S3) or a slurry containing these composite particles and performing a shaping step (S5) and a heat treatment step (S7) as in the first embodiment. The thus obtained green body is strong and has little variation in strength.

The present invention have been described based on the embodiments. However, the present invention is not limited to the abovementioned embodiments. It is easily understood that a variety of modifications are possible without departing from the gist of the present invention.

For example, in the abovementioned respective embodiments of the process for producing a green body, the heat treatment step (S7) is carried out after the shaping step (S5). However, when a green body is formed by additive manufacturing using a 3D printer, the shaping step (S5) and the heat treatment step (S7) can be integrally performed by heating every time when one to several layers are deposited. In the shaping step (S5) of such a case, shaping can be done by using a slurry, and in this case, a drying step is performed before the heat treatment step (S7).

For another example, in treatments of controlling surface charge of the particles by using polymer electrolytes such as the charge control step (S1) and the pretreatment step in the small particle compositing step (S2), repeated washing and particle recovering operations can be omitted by employing the art of adding a polymer electrolyte to particles without excess or deficiency in order not to generate an excess of the polymer electrolyte (International Publication No. WO2012/133696).

For still another example, in the process for producing a green body according to the second embodiment, the resin particles are composited after the small particles are attached on (composited with) the large particles. Instead of this, surface charge of both the small particles and the resin particles can be controlled to have an opposite polarity to that of the large particles, and the small particles and the resin particles can be composited with the large particles in one step. In this case, both the small particles and the resin particles are placed on the same surface of the large particles. Upon appropriately changing a mixing ratio of the small particles and the resin particles in a dispersion medium, the small particles and the resin particles can be loaded on the large particles at a desired ratio. In addition, the coverage ratio of the large particles with the small particles can be decreased so that surface charge of the composite particles of the small particles and the large particles keeps to have the polarity of the surface charge of the large particles. In such a case, upon appropriately controlling the surface charge of the composite particles of the small particles and the large particles and that of the resin particles, location of the resin particles can be controlled as in the above embodiments and thereby predetermined ternary composite particles can be fabricated.

EXAMPLES

The present invention will be hereinafter described in more detail by way of examples, but is not limited to these examples.

Example 1

Composite particles were fabricated by using alumina particles having an average particle size of 3 μm (AA-3 produced by Sumitomo Chemical Co., Ltd.) as large particles and non-crosslinked acrylic particles having an average particle size of 0.4 μm (MP-2701 produced by Soken Chemical & Engineering, Ltd.) as additive particles. Specifically, the pH of an aqueous solution of sodium polystyrene sulfonate (PSS), which is a polyanion (a polymer electrolyte; an anionic polymer), was controlled to 7.0. Then the alumina particles were dispersed in the aqueous solution and the dispersed fluid was agitated for 10 minutes, thereby allowing PSS to be adsorbed on alumina surfaces. Subsequently, the alumina particles were sedimented and supernatant fluid was removed. The sedimented alumina particles were washed with deionized water, thereby removing unadsorbed PSS. Next, the obtained PSS-coated alumina particles were introduced into an aqueous solution of poly diallyl dimethyl ammonium chloride (PDDA), which is a polycation (a polymer electrolyte; a cationic polymer) and the dispersed fluid was agitated for 10 minutes, thereby allowing PDDA to be adsorbed on outermost surfaces of the alumina particles. Subsequently, the PDDA-coated alumina particles were recovered by washing and separating operations in a similar way to the above. The operations of coating PSS and PDDA were repeated a plurality of times so as to deposit PSS and PDDA alternately, and an outermost layer is made PSS so as to make surface charge negative.

On the other hand, the acrylic particles were dispersed in an aqueous solution of sodium deoxycholate (SDC), which is a surfactant, and the dispersed fluid was agitated for 10 minutes, thereby allowing SDC to be adsorbed on surfaces of the acrylic particles. Subsequently, the acrylic particles were recovered from the aqueous solution and washed with deionized water, thereby removing unadsorbed SDC. Next, the obtained SDC-coated acrylic particles were introduced into an aqueous solution of PDDA and the dispersed fluid was agitated for 10 minutes, thereby allowing PDDA to be adsorbed on outermost surfaces of the acrylic particles and making an outermost layer PDDA so as to make surface charge positive. Then the PDDA-coated acrylic particles were recovered by washing and separating operations in a similar way to the above.

Suspensions of the respectively treated particles were prepared and mixed, thereby fabricating composite particles in which the acrylic particles were adsorbed on the alumina surfaces. Subsequently, the suspension containing the composite particles was freeze dried by a freeze dryer (FDU-1200 produced by EYELA), thereby obtaining powder particles.

Figure 5A:
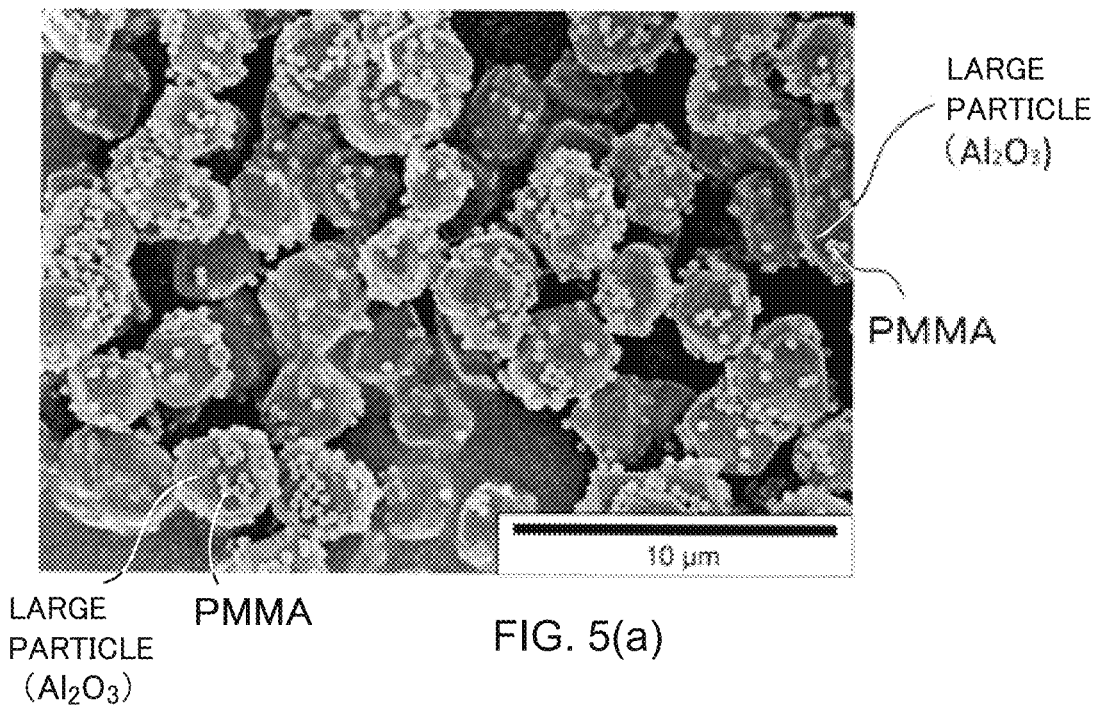
FIGS. 5(a) and 5(b) are electron micrographs of powder particles and a green body obtained in Example 1.

The obtained powder particles were observed with a scanning electron microscope (SEM) (S-4800 produced by Hitachi High Technologies Corporation) (See FIG. 5(a)).

Figure 5B:
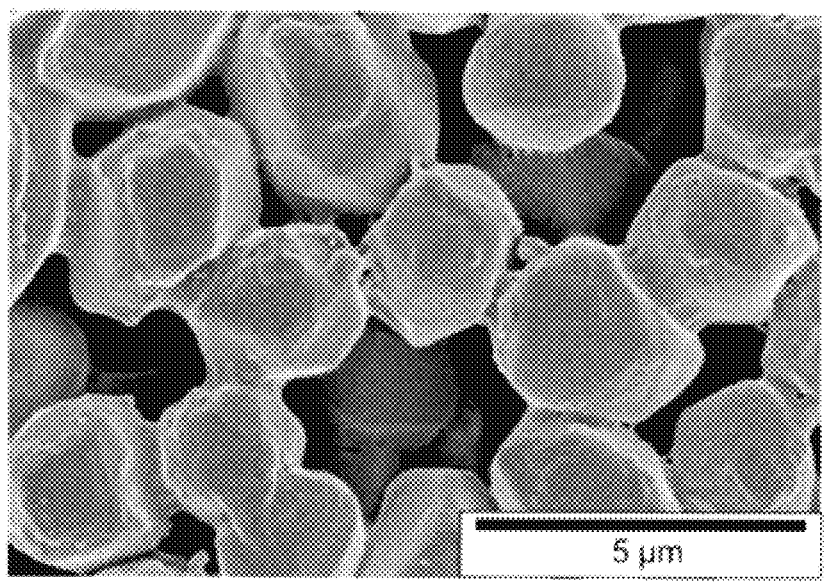

Moreover, the powder particles obtained above were filled in dies and hot pressed by a heat press machine (AH2003 supplied by AS ONE Corporation) at 200 deg. C under 30 MPa for 30 minutes, thereby producing a shaped body (a green body) and at the same time strengthening the green body by heating. An SEM image of the obtained shaped body is shown in FIG. 5(b). Furthermore, formability (strength) of the obtained shaped body was evaluated by measuring indentation hardness. A result is shown in Table 1.

FIGS. 5(a) and 5(b) are SEM images of the powder particles and the shaped body (the green body) of these particles obtained in Example 1. FIG. 5(a) is an SEM image of the powder particles. The image confirms that the acrylic particles as resin particles are attached in a scattered manner on surfaces of the alumina particles as large particles, thereby fabricating composite particles. The image also confirms that all of the powder particles have similar structures.

FIG. 5(b) is an SEM image of the shaped body obtained in Example 1. The image shows that hot-melt acrylic resin bonds the alumina particles with each other, and further shows that the acrylic resin gathers around points at which adjoining alumina particles are in contact with or closest to each other (contact or proximal points) to form necks, and hardly fills voids. That is to say, the image confirms that the resin is located specifically in areas where the resin can effectively contribute to bonding of the alumina particles and that the volume of the binder resin can be drastically reduced.

Example 2

Composite particles were fabricated by using alumina particles having an average particle size of 3 μm (AA-3 produced by Sumitomo Chemical Co., Ltd.) as large particles, alumina particles having an average particle size of 0.1 μm (Taimicron TM-DAR produced by Taimei Chemicals Co., Ltd.) as small particles, and non-crosslinked acrylic particles having an average particle size of 0.4 μm (MP-2701 produced by Soken Chemical & Engineering, Ltd.) as additive particles.

Specifically, the large particles were treated in a similar way to those of Example 1, thereby making their surface charge negative. Next, the pH of an aqueous solution of PSS was controlled to 7.0 and then the alumina particles as small particles were dispersed in the solution and the dispersed fluid was agitated for 10 minutes, thereby allowing PSS to be adsorbed on alumina surfaces. Then the alumina particles were sedimented by centrifugal separation and supernatant fluid was removed. The obtained alumina particles were washed with deionized water, thereby removing unadsorbed PSS. Then the obtained PSS-coated alumina particles were introduced into an aqueous solution of PDDA and the dispersed fluid was agitated for 10 minutes, thereby allowing PDDA to be adsorbed on outermost surfaces of the alumina particles. Then the PDDA-coated alumina particles were recovered by washing and separating operations similar to the above. The operations of coating PSS and PDDA were repeated a plurality of times so as to deposit PSS and PDDA alternately, and an outermost layer is made PDDA so as to make surface charge of the small particle alumina positive.

On the other hand, the acrylic particles were dispersed in an aqueous solution of sodium deoxycholate (SDC) as a surfactant, and the dispersed fluid was agitated for 10 minutes, thereby allowing SDC to be adsorbed on surfaces of the acrylic particles. Then the acrylic particles were recovered from the aqueous solution and washed with deionized water, thereby removing unadsorbed SDC. Next, the obtained SDC-coated acrylic particles were introduced into an aqueous solution of PDDA and the dispersed fluid was agitated for 10 minutes, thereby allowing PDDA to be adsorbed on outermost surfaces of the acrylic particles. Then the PDDA-coated acrylic particles were recovered by similar washing and separating operations to the above. Then PSS was further deposited so as to make an outermost layer PSS. Thus surface charge of the acrylic particles was made negative.

Suspensions of the large particle alumina and the small particle alumina after the above treatments were respectively prepared and then mixed, thereby fabricating composite particles in which the small particle alumina was adsorbed on surfaces of the large particle alumina. Moreover, a suspension of the acrylic particles after the above treatments was prepared and mixed with the suspension in which the composite particles of the large particle alumina and the small particle alumina were dispersed. Thus fabricated were composite particles in which the acrylic particles were adsorbed on the composite particles of the large particle alumina and the small particle alumina. Then the suspension containing the composite particles was freeze dried by the freeze dryer (FDU-1200 produced by EYELA), thereby obtaining powder particles.

Figure 6A:
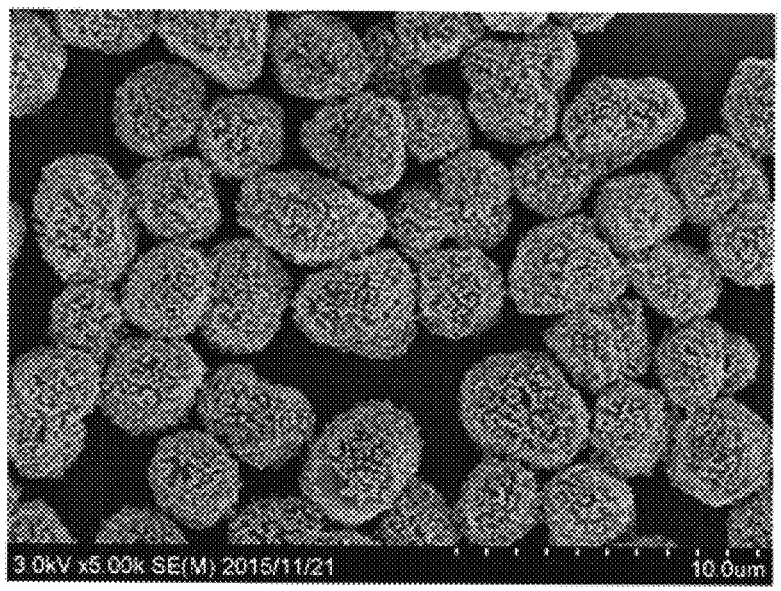
FIGS. 6(a) and 6(b) are electron micrographs of powder particles obtained in Example 2.
Figure 6B:
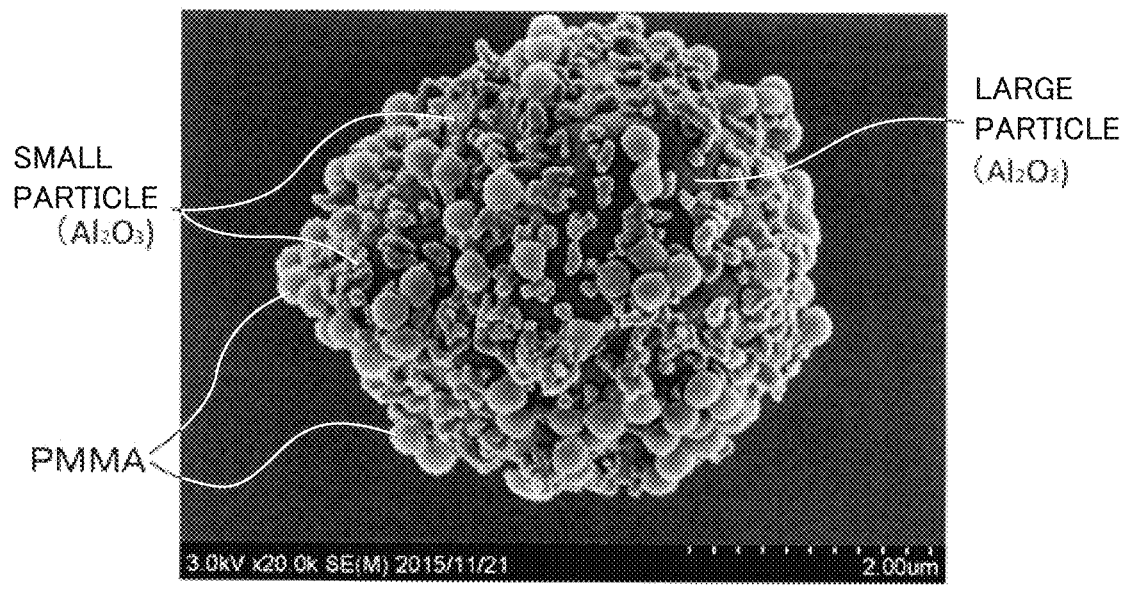

The obtained powder particles were observed with the scanning electron microscope (SEM) (S-4800 produced by Hitachi High Technologies Corporation) (See FIGS. 6(a) and 6(b)).

FIG. 6 are SEM images of the powder particles obtained in Example 2. FIG. 6(a) is an SEM image of the entire powder particles. FIG. 6(b) is an enlarged view of one of the powder particles. As is shown by the image, the composite particles have a structure in which the small particles are attached on most surfaces of the alumina particles and the acrylic particles are further attached thereon in a scattered manner.

Furthermore, in a similar way to Example 1, the powder particles obtained above were filled in dies and hot pressed by the heat press machine (AH2003 supplied by AS ONE Corporation) at 200 deg. C under 30 MPa for 30 minutes, thereby producing a shaped body (a green body) and strengthening the green body by heating. Furthermore, formability (strength) of the obtained shaped body was evaluated by measuring indentation hardness. A result is shown in Table 1.

Comparative Example 1

Alumina particles having an average particle size of 3 μm (AA-3 produced by Sumitomo Chemical Co., Ltd.) and a commercially available binder (a polyvinyl-alcohol-based binder Ceruna WF-804 produced by Chukyo Yushi Co., Ltd.) were respectively mixed in distilled water so that a composition ratio of the binder to the alumina particles was 3 wt. %, thereby preparing a suspension. Then the prepared suspension was freeze dried by the freeze dryer (FDU-1200 produced by EYELA), thereby obtaining powder particles. The binder used in Comparative Example 1 was liquid and the powder particles using the binder were alumina particles coated with the binder.

Moreover, the powder particles obtained above were filled in dies and hot pressed by the heat press machine (AH2003 supplied by AS ONE Corporation) at 200 deg. C under 30 MPa for 30 minutes, thereby producing a shaped body (a green body) and strengthening the green body by heating. Furthermore, formability (strength) of the obtained shaped body was evaluated by measuring indentation hardness. A result is shown in Table 1.

Evaluation Method

Strength of the green bodies using the powder particles obtained in Examples 1, 2 and Comparative Example 1 were compared by measuring indentation hardness. An indentation test was carried out by conventional hardness testing machine (AVK-A produced by Akashi Seisakusho Co. Ltd) with a maximum indentation load of 1.5N and measuring penetration depth and calculating Vickers hardness by using a Vickers indenter.

TABLE 1

| | HARDNESS (MPa) |
|---|---|
| EXAMPLE 1 | 560 |
| EXAMPLE 2 | 480 |
| COMPARATIVE EXAMPLE 1 | 210 |

As shown in Table 1, hardness of the green bodies obtained in Examples 1, 2 is twice or more higher than that of Comparative Example 1. In general, hardness has a correlation with strength. Therefore, Table 1 demonstrates that the green bodies obtained in Examples 1, 2 had high strength.

Experiment

An experiment was conducted to examine strength variation of green bodies formed by using composite powder particles in which resin particles were loaded on surfaces of large particles. Details will be described below.

Preparation of Composite Particle Specimens

Two kinds of specimens having different amounts of resin particles added were prepared in a similar way to Example 1. Composite particles were respectively fabricated by using alumina particles having an average particle size of 3 μm (AA-3 produced by Sumitomo Chemical Co., Ltd.) as large particles and non-crosslinked acrylic particles having an average particle size of 0.4 μm (MP-2701 produced by Soken Chemical & Engineering, Ltd.) as additive particles and controlling the ratio of the additive particles to the large particles to 1 wt. % and 3 wt. %.

Specifically, the pH of an aqueous solution of sodium polystyrene sulfonate (PSS), which is a polyanion (a polymer electrolyte; an anionic polymer), was controlled to 7.0. Then the alumina particles were dispersed in the aqueous solution and the dispersed fluid was agitated for 10 minutes, thereby allowing PSS to be adsorbed on alumina surfaces. Then the alumina particles were sedimented and supernatant fluid was removed. The sedimented alumina particles were washed with deionized water, thereby removing unadsorbed PSS. Next, the obtained PSS-coated alumina particles were introduced into an aqueous solution of poly diallyl dimethyl ammonium chloride (PDDA), which is a polycation (a polymer electrolyte; a cationic polymer) and the dispersed fluid was agitated for 10 minutes, thereby allowing PDDA to be adsorbed on outermost surfaces of the alumina particles. Subsequently, the PDDA-coated alumina particles were recovered by similar washing and separating operations to the above. The operations of coating PSS and PDDA were repeated a plurality of times so as to deposit PSS and PDDA alternately. An outermost layer was made PSS so as to make their surface charge negative.

On the other hand, the acrylic particles were dispersed in an aqueous solution of sodium deoxycholate (SDC), which is a surfactant, and the dispersed fluid was agitated for 10 minutes, thereby allowing SDC to be adsorbed on surfaces of the acrylic particles. Then the acrylic particles were recovered from the aqueous solution and washed with deionized water, thereby removing unadsorbed SDC. Next, the obtained SDC-coated acrylic particles were introduced into an aqueous solution of PDDA and the dispersed fluid was agitated for 10 minutes, thereby allowing PDDA to be adsorbed on outermost surfaces of the acrylic particles and making an outermost layer PDDA. Thus their surface charge was made positive. Then the PDDA-coated acrylic particles were recovered by similar washing and separating operations to the above.

Suspensions of the respectively treated particles were prepared and mixed while controlling weight of the suspensions so that the ratio of the PDDA-coated acrylic particles to the PSS-coated alumina particles was 1 wt. % and 3 wt. %, respectively. Thus fabricated were two kinds of composite particles in which the acrylic particles were adsorbed on the alumina surfaces. Then the suspensions containing the composite particles were freeze dried by the freeze dryer (FDU-1200 produced by EYELA), thereby obtaining two kinds of powder particles.

Figure 7A:
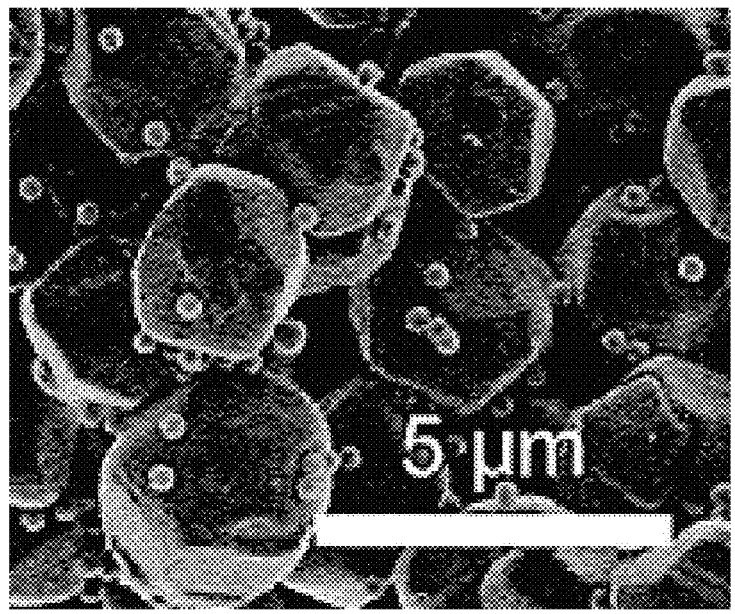
FIGS. 7(a) and 7(b) are electron micrographs of composite particles obtained in preparation of specimens of composite particles.
Figure 7B:
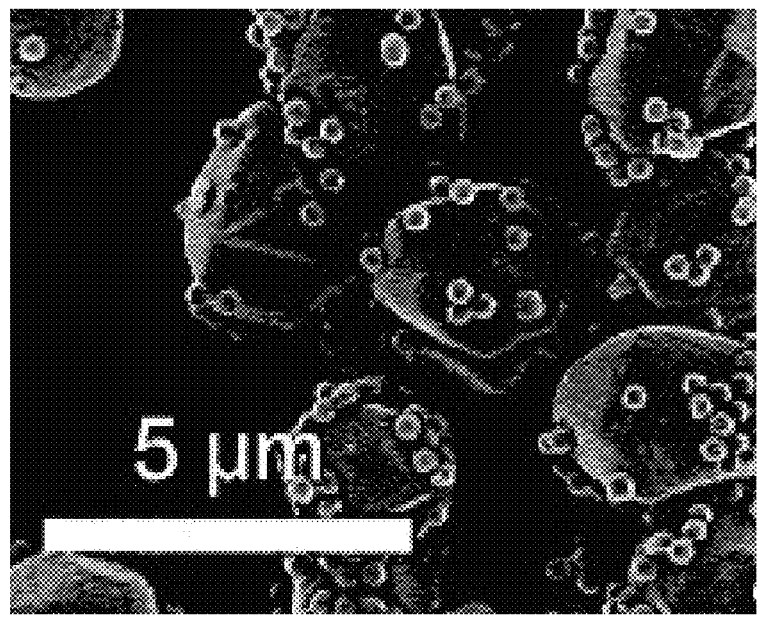

Two kinds of the obtained powder particles were observed with the scanning electron microscope (SEM) (S-4800 produced by Hitachi High Technologies Corporation). Images are shown in FIGS. 7(a) and 7(b). FIG. 7(a) shows the powder particles at the additive particle addition of 1 wt. %, while FIG. 7(b) shows the powder particles at the additive particle addition of 3 wt. %. As shown in FIGS. 7(a) and 7(b), in the powder particles at the additive particle addition of 1 wt. %, about eight additive particles (about four on a photographed side (one side)) were attached on a surface of each of the large particles on average, and when converted into volume ratio based on sizes of the particles, the ratio was about 2%. In the powder particles at the additive particle addition of 3 wt. %, about twenty additive particles (about ten on one side) were attached on a surface of each of the large particles on average, and when similarly converted into volume ratio, the ratio was about 5%.

Two kinds of the powder particles fabricated above were individually filled in dies and hot pressed by the heat press machine (AH2003 supplied by AS ONE Corporation) at 200 deg. C under 30 MPa for 30 minutes, thereby producing shaped bodies (green bodies) and strengthening the green bodies by heating.

Preparation of Comparative Specimens

Two kinds of comparative specimens were fabricated by adding a commercially available binder (a polyvinyl-alcohol-based binder Ceruna WF-804 produced by Chukyo Yushi Co., Ltd.) to alumina particles having an average particle size of 3 µm (AA-3 produced by Sumitomo Chemical Co., Ltd.). Specifically, two kinds of suspensions were prepared by mixing the alumina particles and the binder in distilled water so that the ratio of the binder to the alumina particles was 1 wt. % and 3 wt. %, respectively. Then the prepared suspensions were freeze dried by the freeze dryer (FDU-1200 produced by EYELA), thereby obtaining two kinds of powder particles. The binder used for fabrication of comparative specimens was liquid and the powder particles using the binder were alumina particles coated with the binder.

Moreover, like the specimens of the composite particles, two kinds of the powder particles obtained above were individually filled in dies and hot pressed by the heat press machine (AH2003 supplied by AS ONE Corporation) at 200 deg. C under 30 MPa for 30 minutes, thereby producing shaped bodies (green bodies) and strengthening the green bodies by heating.

Strength Variation Test

Figure 8A:
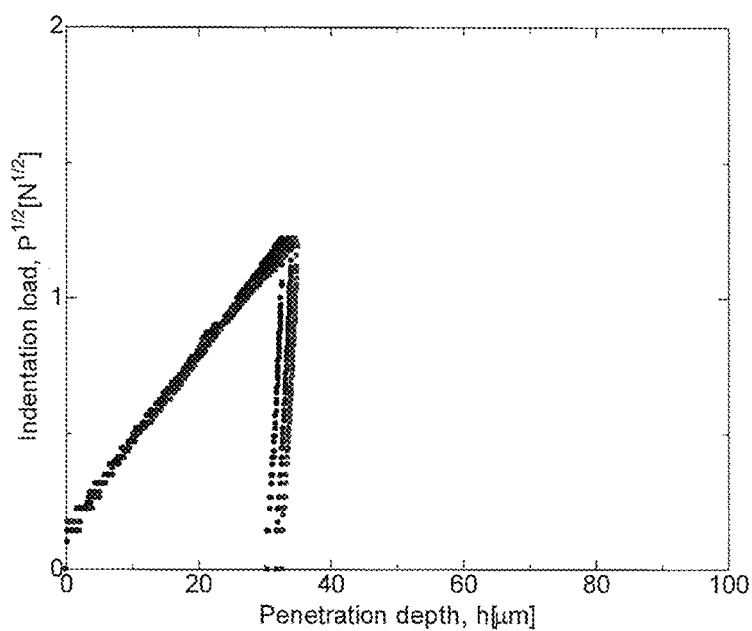
FIGS. 8(a) and 8(b) are graphs of measurement results showing relations between indentation load and penetration depth of specimens of composite particles and comparative specimens.
Figure 8B:
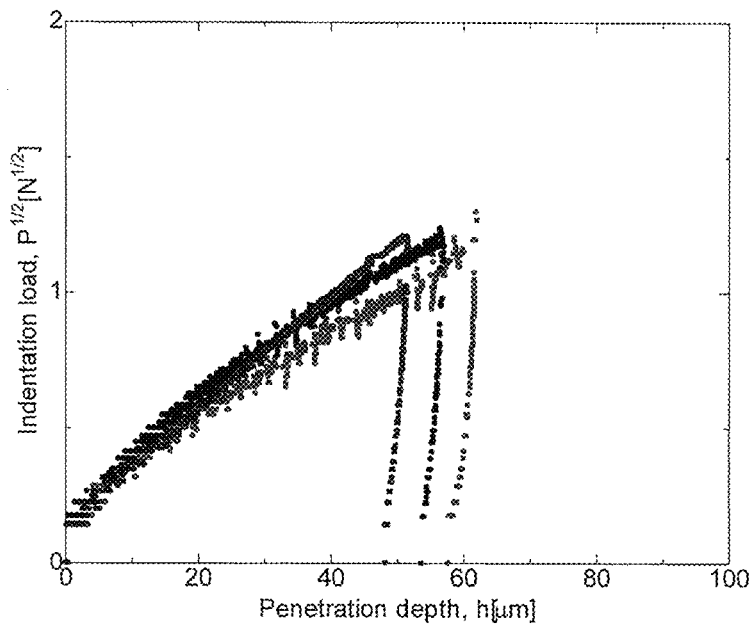
Figure 9A:
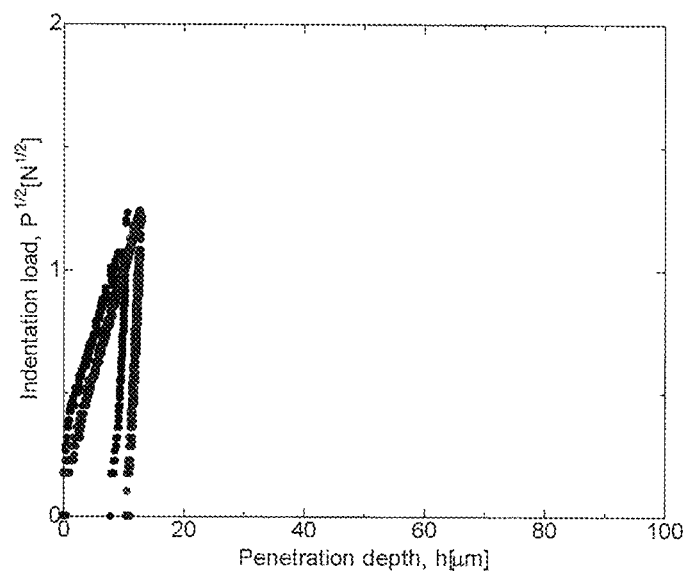
FIGS. 9(a) and 9(b) are graphs of measurement results showing relations between indentation load and penetration depth of specimens of composite particles and comparative specimens.
Figure 9B:
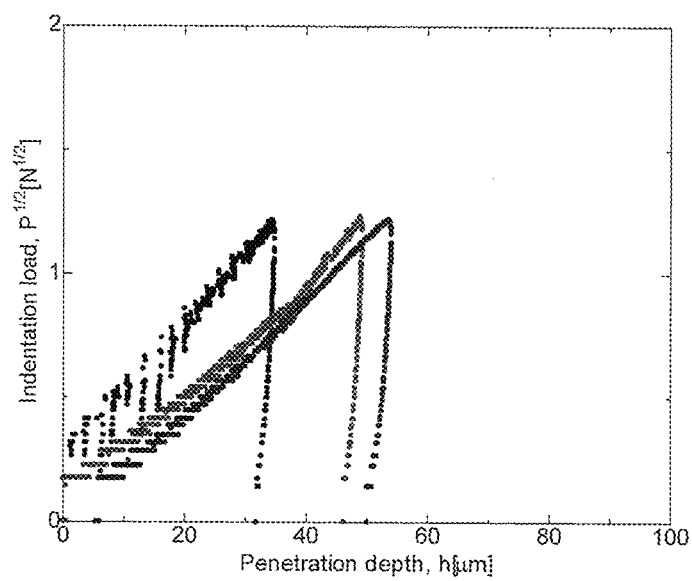

Green bodies using four kinds of the powder particles (two kinds of specimens of composite powders and two kinds of comparative specimens) were examined about a relation between indentation load and penetration depth at three points each by an indentation method. Specifically, a self-build instrumentation type indentation device capable of measuring indentation load and penetration depth was used to measure indentation load and penetration depth of a Vickers indenter under a maximum indentation load of 1.5 N. The measurement was made at three different points. Measurement results are plotted in graphs shown in FIGS. 8(a), 8(b), 9(a) and 9(b). In the graphs, the horizontal axis represents penetration depth (penetration depth (µm) of the indenter) and the vertical axis represents indentation load (a square root of load (N)). FIGS. 8(a) and 8(b) are graphs when the ratio of the resin particles or the binder to the large particles was 1 wt. %. FIG. 8(a) shows results of the specimen of the composite particles and FIG. 8(b) shows results of the comparative specimen. FIGS. 9(a) and 9(b) are graphs when the ratio of the resin particles or the binder to the large particles was 3 wt. %. FIG. 9(a) shows results of the specimen of the composite particles and FIG. 9(b) shows results of the comparative specimen.

Figure 10:
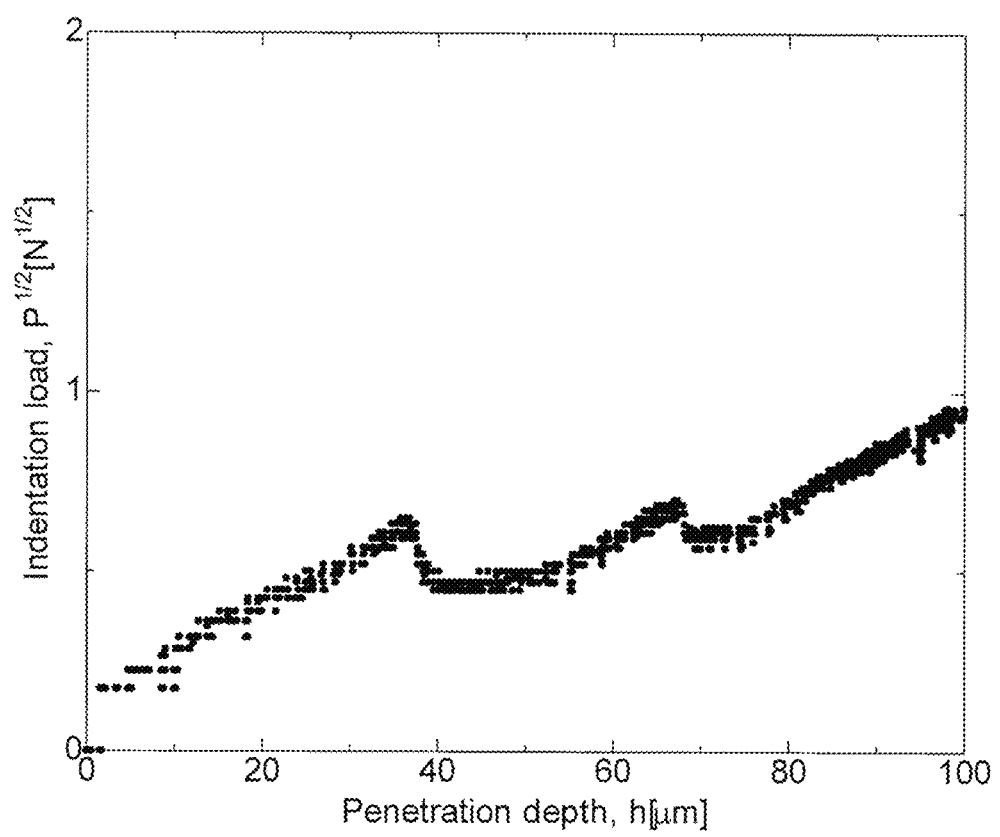
FIG. 10 is a graph of measurement results showing a relation between indentation load and penetration depth of a reference specimen.

In order to more clearly understand these test results, a similar test was conducted as a reference experiment without adding any binder (the amount of the binder added: 0 wt. %). A green body for the reference experiment (a reference specimen) was produced in a similar process to the process of producing the comparative specimen except that no binder was added. The reference specimen was also examined about a relation between indentation load and penetration depth at three points thereof by the indentation method. Results are shown in FIG. 10. FIG. 10 is a graph showing the results in a similar way to the above.

In the above results, in either case in which the ratio of the resin particles or the binder to the large particles was 1 wt. % or 3 wt. %, the comparative specimens had difference in measurement results at three points (three kinds of curves) but the specimens of the composite particles did not have much difference in the measurement results at three points (three kinds of curves). Therefore, it is apparent from this comparison that the specimens of the composite particles were much improved in strength variation. On the other hand, the reference specimen showed similar changes at three points, but showed no clear peak in indentation load. It is apparent from this that a sintered state of the green body was unstable. Taking the test results of the reference specimen into consideration, it can be said that the specimens of the composite particles were good in mechanical strength and the strength is uniform.

Note that the present application concerns results of Japanese government-supported research. The research is "Innovative Production Technology; Development of Nano-Assembly Technique of Advanced Materials and Strategic Applications for Future Industry" of SIP (Cross-Ministerial Strategic Innovation Promotion Program) funded in the 2015 fiscal year by National Research and Development Agency "New Energy and Industrial Technology Development Organization (NEDO)". The sponsored research is subject to Article 19 of Industrial Technology Enhancement Act (a Japanese Law).

REFERENCE SIGNS LIST

1 Large Particle
2 Resin Particle (Thermoplastic Resin Particle)
3 Polymer Electrolyte
4 Small Particle
10, 20 Composite Particle
(Composite Particle, Powder Particle)

S2 Small Particle Compositing Step (Precompositing Step)
S3 Resin Particle Compositing Step (Compositing Step)
S5 Shaping Step (Part of Green Body Forming Step)
S7 Heat Treatment Step (Part of Green Body Forming Step)
S10 Large Particle Charge Control Step
(First Surface Charge Control Step)
S20 Resin Particle Charge Control Step
(Second Surface Charge Control Step)
S30 Small Particle Charge Control Step
(Small Particle Surface Charge Control Step)

The invention claimed is:

1. Powder particles, comprising large particles to be a main component of a sintering body, and thermoplastic resin particles having a smaller particle size than the large particles and loaded on surfaces of the large particles, wherein the thermoplastic resin particles are scattered on the surfaces of the large particles and are within a volume ratio range of from 2% to 5% with respect to the large particles;
the small particles having higher sinterability to that of the large particles or a function as an auxiliary sintering additives and a smaller particle size than the large particles are attached on the surfaces of the large particles;
the small particles have an average particle size of not more than 150 nm.

2. The powder particles recited in claim 1, wherein the large particles have an average particles size of not less than 500 nm and not more than 5 μm.

3. The powder particles recited in claim 1, wherein the surfaces of the large particles are covered with the small particles at a coverage ratio of not less than 40% and not more than 100% with respect to the entire surfaces of the large particles.

4. The powder particles recited in claim 1, wherein part or all of the thermoplastic resin particles are loaded on the large particles by way of the small particles attached on the surfaces of the large particles, and located in a manner to be scattered on the surfaces of the large particles.

5. The powder particles recited in claim 1, wherein each of the large particles, the small particles, and the thermoplastic resin particles has a polymer electrolyte on a surface thereof, and contacts another particle by way of the polymer electrolyte.

6. The powder particles recited in claim 5, wherein the polymer electrolyte held by each of the particles has a thickness of not more than 20 nm.

7. Powder particles, comprising large particles to be a main component of a sintering body, and thermoplastic resin particles having a smaller particle size than the large particles and loaded on surfaces of the large particles, wherein the thermoplastic resin particles are scattered on the surfaces of the large particles in an amount within a predetermined volume ratio range with respect to the large particles, and the average number of the thermoplastic resin particles loaded on a surface of each of the large particles is not less than 4 and not more than 120;
the small particles having higher sinterability to that of the large particles or a function as an auxiliary sintering additives and a smaller particle size than the large particles are attached on the surfaces of the large particles;
the small particles have an average particle size of not more than 150 nm.

8. The powder particles recited in claim 7, wherein the large particles have an average particles size of not less than 500 nm and not more than 5 μm.

9. The powder particles recited in claim 7, wherein the surfaces of the large particles are covered with the small particles at a coverage ratio of not less than 40% and not more than 100% with respect to the entire surfaces of the large particles.

10. The powder particles recited in claim 7, wherein part or all of the thermoplastic resin particles are loaded on the large particles by way of the small particles attached on the surfaces of the large particles, and located in a manner to be scattered on the surfaces of the large particles.

11. The powder particles recited in claim 7, wherein each of the large particles, the small particles, and the thermoplastic resin particles has a polymer electrolyte on a surface thereof, and contacts another particle by way of the polymer electrolyte.

12. The powder particles recited in claim 11, wherein the polymer electrolyte held by each of the particles has a thickness of not more than 20 nm.

13. A process for producing a green body, comprising:
a first surface charge control step of controlling, in liquid, surface charge of large particles to be a main component of a sintered body;
a small particle surface charge control step of controlling, in liquid, surface charge of small particles having higher sinterability to that of the large particles or a function as an auxiliary sintering additives and a smaller particle size than the large particles so as to have an opposite polarity to that of surface charge of the large particles treated in the first surface charge control step;
a precompositing step of fabricating composite particles of the large particles and the small particles by mixing, in liquid, the small particles treated in the small particle surface charge control step and the large particles treated in the first surface charge control step to composite the large particles and the small particles by electrostatic attraction;
a second surface charge control step of controlling, in liquid, surface charge of thermoplastic resin particles having a smaller particle size than the large particles so as to have an opposite polarity to that of surface charge of the composite particles fabricated in the precompositing step in order to attach the thermoplastic resin particles on the large particles treated in the first surface charge control step by electrostatic attraction;
a compositing step of mixing, in liquid, the composite particles of the large particles and the small particles fabricated in the precompositing step and the thermoplastic resin particles treated in the second surface charge control step to further composite the composite particles and the thermoplastic resin particles by electrostatic attraction; and
a green body forming step of shaping a green body by using the composite particles obtained by the compositing step, heating the green body above a melting temperature of the thermoplastic resin particles contained in the green body and then cooling the heated green body.

14. The process for producing a green body, recited in claim 13, wherein the green body forming step is to shape the green body by using a slurry in which the composite particles obtained in the compositing step are dispersed, dry the shaped green body and then heat the dried green body above the melting temperature of the thermoplastic resin particles.

* * * * *